US011949279B2

(12) United States Patent
Cohn et al.

(10) Patent No.: US 11,949,279 B2
(45) Date of Patent: Apr. 2, 2024

(54) DISPATCHABLE FLEXIBLE ELECTRICITY GENERATION FOR RELIABLE DECARBONIZED GRIDS USING MULTIPLEXED LOW-COST ENGINES

(71) Applicants: Daniel R. Cohn, Bridgton, ME (US); Leslie Bromberg, Sharon, MA (US); Howard Gruenspecht, Silver Spring, MD (US)

(72) Inventors: Daniel R. Cohn, Bridgton, ME (US); Leslie Bromberg, Sharon, MA (US); Howard Gruenspecht, Silver Spring, MD (US)

(*) Notice: Subject to any disclaimer, the term of this patent is extended or adjusted under 35 U.S.C. 154(b) by 27 days.

(21) Appl. No.: 17/910,189

(22) PCT Filed: Mar. 30, 2021

(86) PCT No.: PCT/US2021/024846
§ 371 (c)(1),
(2) Date: Sep. 8, 2022

(87) PCT Pub. No.: WO2021/221847
PCT Pub. Date: Nov. 4, 2021

(65) Prior Publication Data
US 2023/0187964 A1 Jun. 15, 2023

Related U.S. Application Data

(60) Provisional application No. 63/147,900, filed on Feb. 10, 2021, provisional application No. 63/106,930, (Continued)

(51) Int. Cl.
*H02J 9/06* (2006.01)
*H02J 3/38* (2006.01)

(52) U.S. Cl.
CPC .............. *H02J 9/06* (2013.01); *H02J 3/381* (2013.01); *H02J 2300/10* (2020.01); *H02J 2300/24* (2020.01); *H02J 2300/28* (2020.01)

(58) Field of Classification Search
CPC .......... H02J 9/06; H02J 3/381; H02J 2300/28; H02J 2300/10; H02J 2300/24; H02J 3/38
See application file for complete search history.

(56) References Cited

U.S. PATENT DOCUMENTS 8,427,005 B1   4/2013   Kisner et al.
8,495,869 B2   7/2013   Beissler et al.
(Continued)

OTHER PUBLICATIONS

International Search Report and Written Opinion dated Jun. 23, 2021 in corresponding PCT application No. PCT/US2021/024846.

*Primary Examiner* — Robert L Deberadinis
(74) *Attorney, Agent, or Firm* — NIELDS, LEMACK & FRAME, LLC

(57) ABSTRACT

Modular electricity generation systems that use large numbers of low-cost Multiplexed Automotive Engines (MAE) to provide dispatchable electricity for decarbonized grid reliability or for non-grid backup power are disclosed. The engines may be disposed in power modules that are readily transportable containers that house several engine-generator units and typically produce 1 to 2 MW of maximum power. The MAE-based generation approach could provide greater flexibility in fuel use; power rating; transportability and location, along with faster startup time and very low air pollution. MAE electricity generation systems can be fueled with natural gas, low-carbon hydrogen and/or various liquids that may or may not be produced by grid electricity. The MAE generation systems can be employed in an energy storage process that uses surplus grid generated electricity from wind or solar energy to produce a fuel that is stored and later converted back into electricity when needed.

31 Claims, 14 Drawing Sheets

Related U.S. Application Data filed on Oct. 29, 2020, provisional application No. 63/016,648, filed on Apr. 28, 2020.

(56) References Cited

U.S. PATENT DOCUMENTS

| | | |
|---|---|---|
| 2003/0200955 A1 | 10/2003 | zur Loye et al. |
| 2011/0215640 A1 | 9/2011 | Donnelly et al. |
| 2014/0210213 A1 | 7/2014 | Campion et al. |
| 2016/0273211 A1 | 9/2016 | Brewer et al. |
| 2016/0369689 A1* | 12/2016 | Brewer .................. H02J 3/381 |
| 2017/0237264 A1 | 8/2017 | Johnson et al. |
| 2018/0123349 A1 | 5/2018 | Gleave et al. |
| 2023/0042829 A1 | 2/2023 | Cohn et al. |

* cited by examiner

DISPATCHABLE FLEXIBLE ELECTRICITY GENERATION FOR RELIABLE DECARBONIZED GRIDS USING MULTIPLEXED LOW-COST ENGINES

This application claims priority to U.S. Provisional Patent Application Ser. No. 63/016,648 filed Apr. 28, 2020; U.S. Provisional Patent Application Ser. No. 63/106,930, filed Oct. 29, 2020; and U.S. Provisional Patent Application Ser. No. 63/147,900, filed Feb. 10, 2021, the disclosures of which are incorporated by reference in their entities.

BACKGROUND

There is a growing need to ensure the reliability of electricity grids by providing affordable, clean and flexible dispatchable power which compensates for infrequent long duration (e.g. greater than 12 hours) shortfalls in the grid's electricity supply. This power is sometimes referred to as "supplemental power", "backup power" or "peak power".

These supply shortfalls can result from unusual periods of peak demand. They can also result from unusual decreases in supply that can result from disruptions in generation and transmission. The issues that California has faced from increased demand due to high temperatures and reduced supply due to fires are examples of these shortfalls.

The need for supplemental power will increase as greater fractions of grid electricity are provided by variable renewable electricity (VRE) from wind and solar power as grids become more decarbonized. An example is a relatively low probability case where the wind in a significant region essentially stops blowing for more than a day. There will be a greater need for supplemental power driven by the increase in total grid power that is expected to result from increased use of electricity for transportation and other sectors of the economy.

A particularly important need for this low cost dispatchable power is for low capacity factor (CF) applications where the total yearly need amounts to only a small overall fraction of time during the year (e.g. for operation with a capacity factor of less than 10%.). In this case, the capital cost per megawatt hour (MWh) can be difficult to afford if the installed cost per KW of the dispatchable power source is not sufficiently low.

Supplementary power for addressing these supply shortfalls has been mostly provided by Open Cycle Gas Turbines (OCGT). However, in certain places (e.g. California), there are air emissions and location issues with present units and future OCGT units face challenges that include high capital expense due to low capacity factor operation. In addition, OCGT units have limited flexibility in terms of minimum affordable size, efficient operation when their power output is reduced and capability for switching between a wide range of fuels. Moreover, although batteries are now being installed to address supplemental power needs, their cost increases with the duration over which they must supply electricity and at present they are generally too expensive for durations that last over 4 hours.

Therefore, a modular electricity generation system that can provide power during these times of increased demand and/or decreased supply would be beneficial.

SUMMARY

Modular electricity generation systems that use Multiplexed Automotive Engines (MAE) are disclosed. These modular electricity generation systems can provide clean power at a substantially lower cost than presently deployed systems for addressing these needs. In addition to lower cost, the MAE-based generation approach can also provide greater flexibility in areas that include: fuels; power rating; location; and in use for reconfiguration of the grid. MAE systems may be particularly attractive for distributed electricity from generation systems that are designed for maximum power levels of 30 MW or less.

MAE electricity generation systems can be fueled with natural gas or other fuels which can be either gases or liquids. In some cases, the fuel may be produced with the use of grid electricity. These fuels can include low-carbon fuels. The MAE-based generation systems can also be employed in an energy storage process that uses grid generated electricity to produce a fuel that is stored (e.g. hydrogen from water electrolysis) and then converted back into electricity by the MAE-based electricity generation systems when needed.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Dispatchable Flexible Electricity Using Low-Cost Multiplexed Automotive Engines (MAE)

The low-cost generation systems may use combinations of a large number of engine-generator units that employ mass-produced low-cost automobile engines together with mass-produced electrical components produced for electric vehicles. These highly-multiplexed systems could be presently deployed while also providing the potential for improved features, if needed. While they are especially useful for applications where the capacity factor is less than 10%, these systems may also be useful for higher capacity factor applications (e.g. in the 11-25% range). An illustrative number of engine-generator units in a highly-multiplexed generation system is a hundred or greater.

Figure 1:
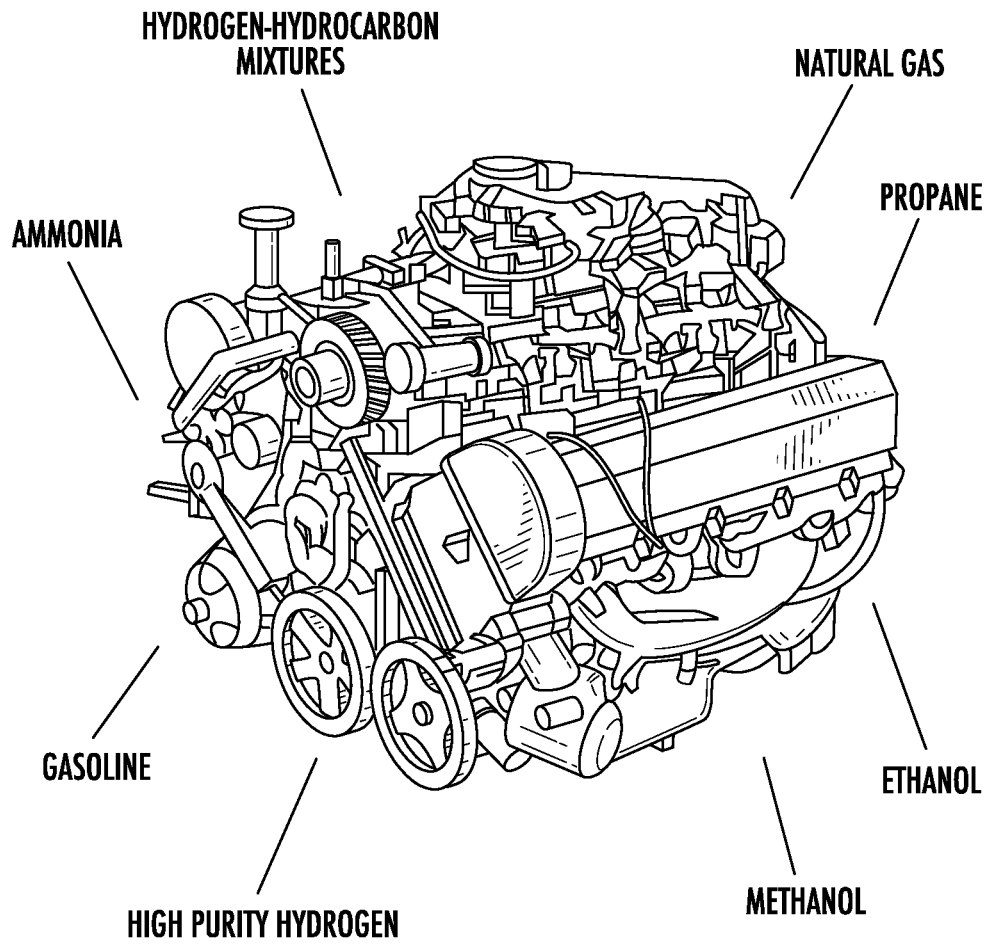
FIG. 1 shows fuels that may be used in MAE-based generation using spark ignition engines.

Spark ignition (SI) engines are preferred for these systems. However, in some certain cases, compression ignition engines could be employed. SI engines produce much lower air pollutant levels than diesel engines and can provide greater flexibility in switching between the fuels that could be used to generate the dispatchable grid power. These fuels that may be utilized by the engine are shown in FIG. 1.

The SI engines can be fueled with gaseous fuels that include natural gas; high purity hydrogen from electrolysis; and/or with hydrogen-hydrocarbon mixtures that mainly contain hydrogen and can be referred to as "hydrogen-rich gas". These mainly hydrogen mixtures could potentially be produced by less expensive processes than electrolysis (e.g. hydrogen from natural gas plus $CO_2$ capture and sequestration or pyrolytic production of hydrogen and elemental carbon from natural gas). They can also be fueled with a wide range of liquid fuels which may allow a greater choice of locations for backup power than gaseous fuels. These liquid fuels include ethanol, gasoline, methanol and propane.

Ethanol may be of particular interest because present US corn-based ethanol is a low carbon fuel that is presently produced in the US in relatively large quantities. Corn-based ethanol can provide up to around 39% lower lifecycle greenhouse gas emissions than natural gas or diesel fuel. It has a well-established distribution system. Moreover, the carbon intensity of ethanol could be further reduced to around 80% less than diesel fuel by the capture of the $CO_2$ that is generated in a biorefinery. Ethanol also has the safety advantage of having a much higher flash temperature than gasoline thereby providing more flexibility as to where it is stored. This could facilitate storage of ethanol in a building as is the case with diesel. The carbon intensity of ethanol can also be reduced by use of sugar as a feedstock.

In the longer term, lower carbon intensity ethanol (and methanol) could also be potentially produced at large scale from a variety of feedstocks that include municipal solid waste (MSW), forestry waste and agricultural waste. Because they are room temperature liquids that are easy to transport and store, ethanol and methanol could offer important cost and flexibility advantages relative to hydrogen. In addition, renewable electricity can be used in a substantial way in the production of these alcohol fuels (or for production of hydrogen) from these feedstocks and these production processes can thus provide a means of storing excess renewable electricity.

An optimized MAE-based generator operated at its sweet spot (with unthrottled operation) can achieve a fuel-to-power efficiency of 42% to 45% when fueled with hydrogen, and can be greater than 45% and preferably as high as 50% when alcohol fuels are used and Open Rankine Cycle (ORC) with alcohol reformate is employed; and around 42% when fueled with natural gas. The typical fuel economy of conventional engines powered vehicles reflects substantially lower engine efficiency; this is due to the substantially lower engine efficiency at low-load and part-load operation compared to operation at the efficiency sweet spot.

Air Pollutants

NOx and other air pollutant emissions from the engines may be reduced to very low levels (e.g. NOx could be reduced to around 20 ppm) by use of highly effective catalytic converter exhaust treatment, such as, for example, a three-way catalyst exhaust treatment used with stoichiometric fuel/air ratio operation that is presently employed in automobiles. This level is less than 10% of NOx emissions of older OCGTs presently in service in California.

The NOx levels from MAE systems could be around 1% of the NOx emissions from typical diesel engine's generator systems that are used for supplementary grid power or backup or emergency off grid power where these diesel systems do not use complex and expensive exhaust treatment systems using diesel exhaust fluid (DEF). The NOx level from the MAE-based systems using stoichiometric fuel/air ratio operation and a three-way catalyst exhaust treatment system could still be only 10% of that of the diesel engine generator coupled to a diesel exhaust treatment system.

Moreover, if desired, the NOx from MAE-systems may be further reduced by an approach that uses other NOx reducing technologies in addition to use of the three-way catalyst and stoichiometric engine operation. One such approach is to reduce engine out NOX by operation at a higher EGR level (which can be referred to as "heavy EGR") that is enabled by a means to provide greater combustion stability. Greater combustion stability may be achieved by utilization of a stronger electrical ignition system such as an optimized plasma-based alternative to a conventional spark plug or through the use of a prechamber. A further option is to combine the use of the of both prechamber and stronger electrical ignition system.

A second approach is to use selective catalytic reduction (SCR) treatment of NOx downstream from a three-way catalyst. In this approach, air would be introduced into the exhaust downstream of the three-way catalyst to provide a suitable lean mixture for the SCR. The first and second approaches can also be combined.

Figure 2:
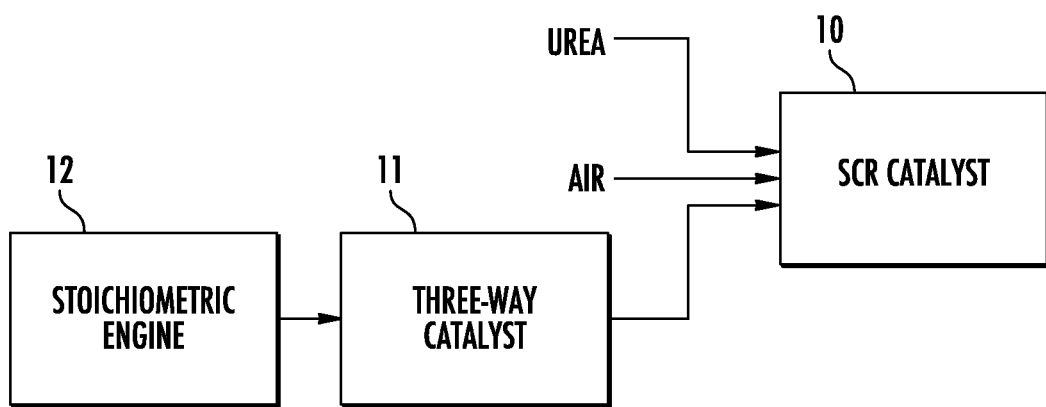
FIG. 2 shows an embodiment using an SCR catalyst for further NOx reduction after reduction by a three-way catalyst.

FIG. 2 shows an embodiment using an SCR catalyst 10 for further NOx reduction after reduction by a three-way catalyst 11. Urea or other Diesel Exhaust Fluid is used for the NOx reduction by the SCR catalyst 10 and air is added to provide lean air/fuel ratio conditions. The combination of the stoichiometric engine 12 with 3-way catalysts 11 decreases the concentration of NOx to a few tens of ppm. The combination of a three-way catalyst 11 with an SCR catalyst 10 further decreases the NOx concentration by another factor of 10, to single digits (i.e. less than 10 ppm and preferably less than 2 ppm). The operation of the engine 12 at a narrow set of conditions at high load (the sweet spot) generates adequate temperature for the three-way catalyst 11 and the SCR catalyst 10 downstream from the three-way catalyst. Control of the urea dosing is also facilitated by the constant operating conditions, both in terms of temperature and exhaust flow rate. It may be desirable to control both the emissions of NOx and ammonia when SCR is employed. Conventional methods can be used for the prevention of ammonia release, including an ammonia oxidation catalyst downstream of the SCR, if needed. Because the engines operate over a very narrow set of conditions (near the sweet spot), the control system for the SCR can be simplified. The dosing and the monitoring of the SCR unit is much simplified. Ideally, the ammonia on the catalyst or the ammonia/NOx in the SCR exit can be measured to provide feedback. In addition, an open-loop control is also possible, by itself or in combination with a close loop system.

As an alternative to operating the engine with stoichiometric or substantially stoichiometric operation, it may be advantageous to use very lean operation. Operation of the engine with hydrogen, ethanol or methanol could enable higher EGR or leaner operation than is possible with other fuels due to faster combustion. Very low NOx operation may be possible by use of very lean operation. Exhaust gas reforming of ethanol or methanol into mixtures of hydrogen and carbon dioxide may also be used for obtaining more dilute engine operation such as leaner operation or higher EGR.

It may be possible to further reduce NOx emissions from very lean engine operation by the use of a SCR catalyst 10. The use of the reagent (e.g. urea) could be small, because of the very low NOx emissions from a hydrogen fueled engine. Furthermore, operating very lean with hydrogen could increase the efficiency of the engine by running cooler and having less of the heat transferred to the engine block. The lower combustion temperatures should also decrease the thermal loading of the engine, increasing its lifetime.

Turbocharged engine operation may be especially advantageous for engines using ultra lean operation (e.g. with air/fuel mixtures where lambda is 2 or greater) by providing higher engine power density and thereby reducing cost/kW.

The use of a catalyst close to the engine can also be used to minimize cold start emissions, which works for the case of engines operating without a three-way catalyst. In the case of a three-way catalyst used with stoichiometric engines, placing the three-way catalyst close to the engine would be useful for controlling cold start emissions, while the SCR may be placed further downstream from the engine.

A further option is the use of hot EGR and lean operation. The hot EGR results in increased temperature during the initial sparking times, resulting in increased rate of heat release and decreased variability (i.e., capability to avoid misfire). On the other hand, the excess air and EGR dilution reduce the temperatures of the cylinder during combustion, reducing both NOx emissions as well as increasing efficiency. The use of hot EGR and lean operation may provide advantages relative to the use of cool EGR and lean operation which has been previously investigated.

Other means of controlling emissions include the use of scrubbers. Although impractical for mobile applications (with the potential exception of ship engines), scrubbers can be used for controlling emissions from low duty operation stationary power systems. The liquid required can be stored prior to use, and recycled afterwards. As scrubbers are not attractive for single engine operation, a scrubber can be used either per power module that includes several engines or for a combination of power modules.

Use of one or more the approaches described above may reduce NOx emissions to less than 10 ppm and preferably 2 ppm or less for stoichiometric operation or its equivalent for ultra lean operation. The MAE engine approach could thus provide the advantage of ultra low NOx levels which are around 1% of older OCGTs now in service and around 10% of new OCGTs.

Modular Approach

The MAE-based generation systems can be provided by modular containers that include several, such as between 4 and 12, engine-generator units and provide a peak power capability of one to three MW. Each engine-generator unit in one of these power modules would produce peak electricity power levels in the 100 KW to 300 KW range. Each engine-generator unit would be typically operated at a "sweet spot" with produces power at a high fraction of the its peak electric power capability (e.g. 60% or more). A typical maximum electrical output of a power module with all engine-generators on and operating at their sweet spot would typically be in the range of one to two megawatts.

The containerized power modules would be complete power producing units that can be transported by truck to a generation site. The weight of the modules (20 tons or less) allows the containers to be hauled by truck to generation sites without special road permits.

An MAE-based generation system that includes multiple power modules can provide a total maximum power capability from one megawatt to hundreds of megawatts depending on the number of power modules that are deployed. A typical MAE-based generation system would use a highly-multiplexed number of engines, such as, for example, more than 100 engines.

Figure 3:
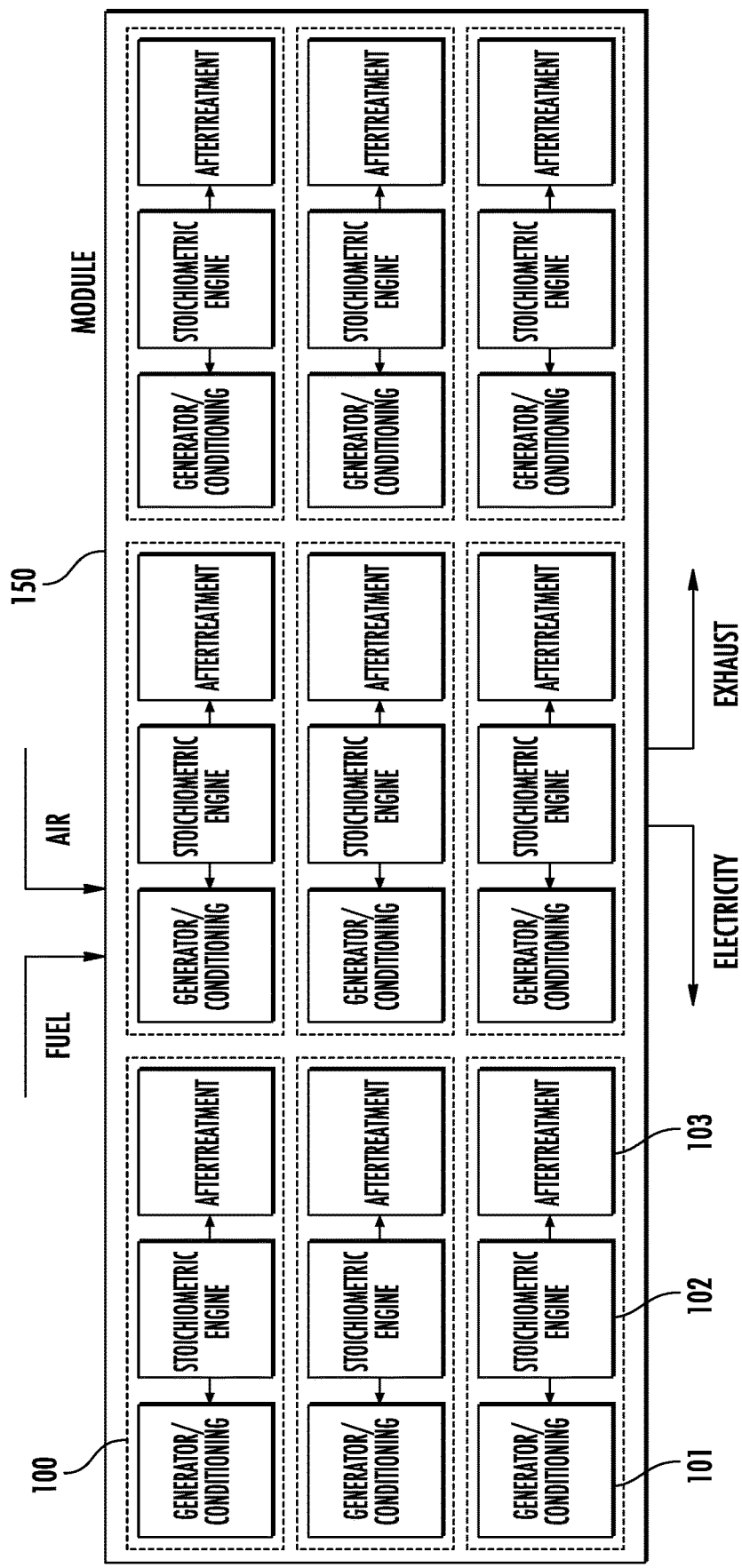
FIG. 3 shows a container power module according to one embodiment.

FIG. 3 shows a first embodiment of a container module, also referred to as a power module 150. Each engine-generator unit is independent. The engine-generator units 100 can be operated separately or used in various combinations. The container module is a complete factory-produced power source. After, it is hauled to the generation site, it connected to fuel sources and to electricity transmission lines that connect the produced electricity to the grid.

The power module 150 that is schematically illustrated in FIG. 3 contains 9 engine-generator units 100, where each engine-generator unit 100 comprises a generator/conditioning unit 101, a stoichiometric engine 102 and an aftertreatment unit 103. Although the disclosure describes stoichiometric engines, it is possible to also use compression ignition automotive engines (i.e., diesel cycle), operating lean. In this case, the aftertreatment could include a diesel particulate filter, for controlling particulate emissions, and Selective Catalytic reactor (SCR) for controlling of NOx.

Figure 4:
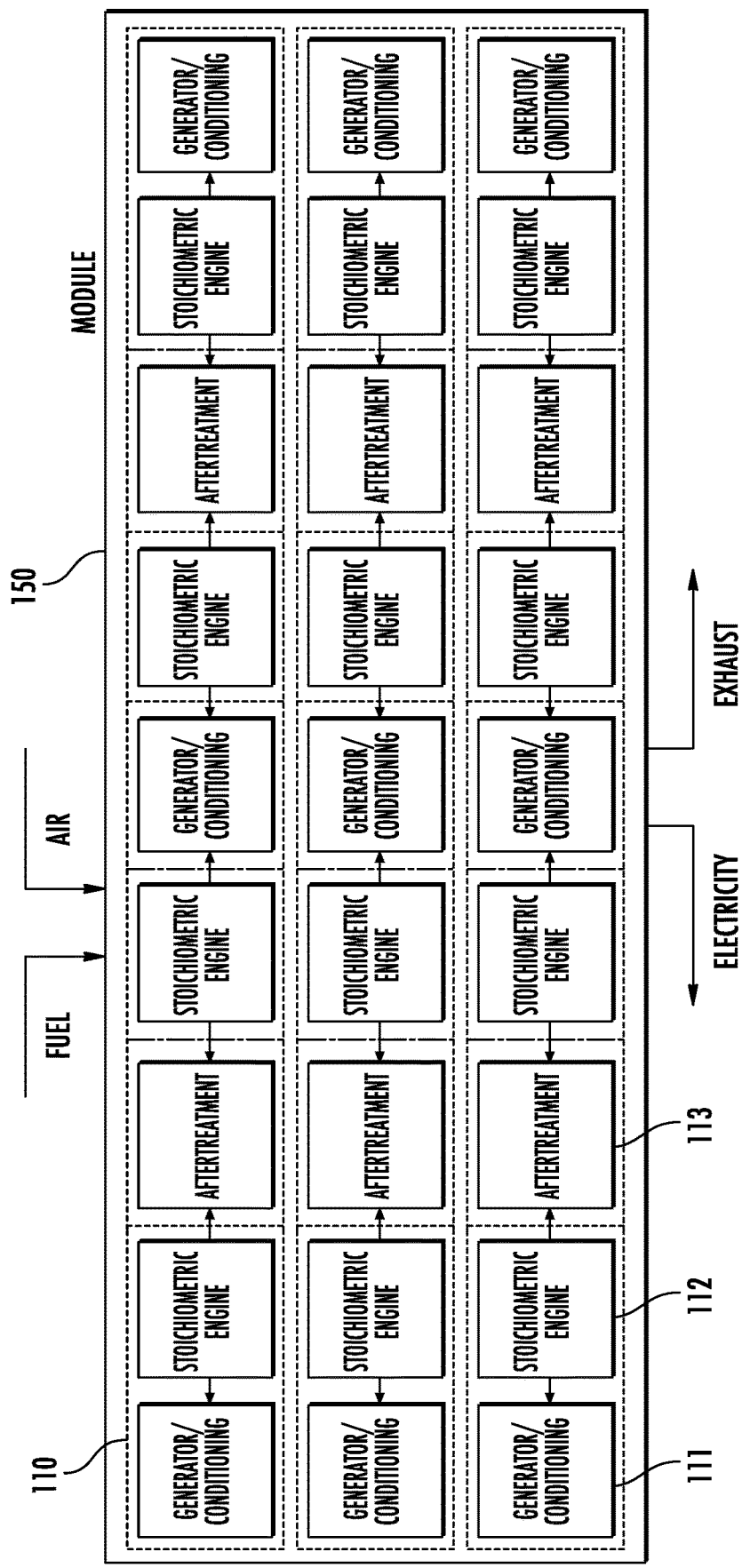
FIG. 4 shows a container power module according to a second embodiment.

As mentioned elsewhere, the engine-generator units can be integrated to minimize the number of components and also to decrease the required assembly and maintenance. An example is shown in FIG. 4. In FIG. 4, the three left most engine-generator units 110 share the aftertreatment unit 113 with the engines adjacent, decreasing the number of components. Also shown is an example were two adjacent engines 112 share a generator/conditioning unit 111. Either option (combining aftertreatment units, combining generator/conditioning units) can be used, either separately or combined in a power module 150. Other components can also be shared, such as the fuel pumps, the air filters, air compressors, lubrication and coolant loops, and other components in the engine-generator units.

Figure 5:
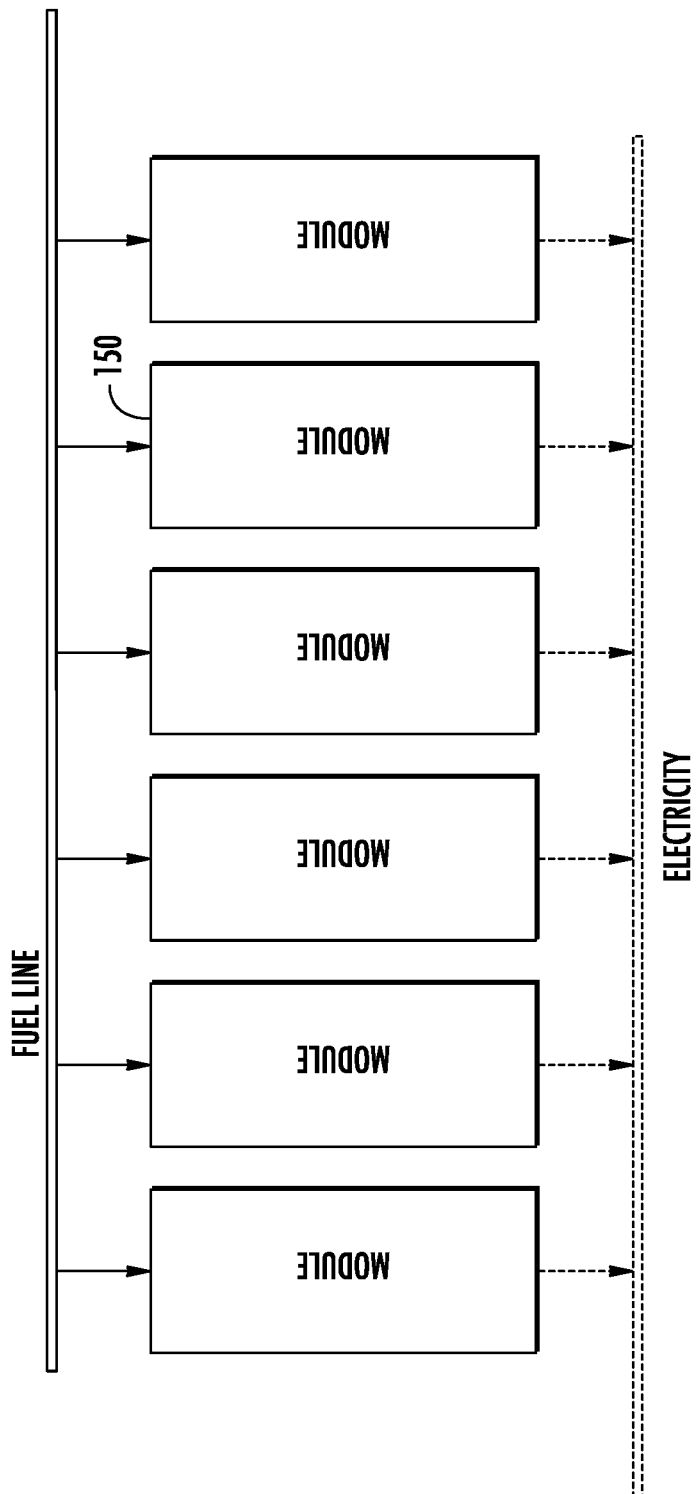
FIG. 5 shows a generation system with several power modules at the generation site.

FIG. 5 shows a generation system with several power modules 150 at the generation site. Each power module 150 is transported to the site. Once at the site, the fuel line is connected to each power module 150, and each power module is connected to the grid. The site needs to be prepared to receive the units, but once that is done, performing the connections is relatively straightforward, compared with an OCGT. The power modules 150 may be tested prior to shipping, and commissioning of each power module is relatively straight forward.

The power modules 150 are enclosed in the container, and protected from the environment. In very cold times, the units can be operated, even at idle, to provide some heat. Automotive engines are designed to be able to start under very cold conditions. Additionally, the enclosure does offer some protection from the weather. Under very high temperature conditions, it may be possible to open partially the container and use natural convection to provide some limited cooling of the units. Some of the electricity that is generated may be needed for cooling of the power modules.

The MAE-based supplemental power systems can be used in a grid by themselves or in combination with other dispatchable power systems. These other dispatchable power systems include but are not limited to combined cycle gas turbines (CCGTs) and Open Cycle Gas Turbines (OC- CGTs) operated on natural gas and other fuels. They can provide advantages of being already installed and/or providing higher power levels than MAE supplemental power systems.

In contrast to the high installation cost for a typical OCGT, which involves substantial assembly work at a generator site, the installation cost for an MAE-based generation system would be low due to the use of the factory assembled container modules. The reduced installation cost is a significant factor in the projection of a cost KW of an MAE supplemental power system of around $100/kW in contrast to a representative cost of $700/kW for an OCGT.

In addition to providing a means for reducing the capital expense for delivering a given amount of desired dispatchable power capability relative to an OCGT, the much lower capital expense of an MAE-based system could provide an option for providing seven times more dispatchable power capability for the same capital expense based on this cost/KW differential. Providing this additional dispatchable power capability at the same cost as existing means can provide important improvements in grid reliability especially when addressing low probability electricity supply shortfalls.

An MAE-based generation system can provide high efficiency (e.g. 40-45%) power by operating the engines at parameters that provide the highest efficiency with the system power level being varied by turning various modules on and off and/or by turning some (but not all) the engine-generator units within modules on and off. This "digital control" of power makes it possible to operate the generation system at very low power levels without reduced efficiency. The engines are operated at a "sweet spot" in throttling and engine speed.

An illustrative range for the sweet spot is 2000-4000 rpm and 12 to 16 bar brake Mean Effective Pressure (BMEP) for a modified turbocharged SI automotive engine. A turbocharged engine is generally preferred because it can provide higher power density, especially for a lean engine. If a naturally aspirated engine were to be used, the sweet spot may be 2000-3500 rpm and 10 to 14 bar. The engine compression ratio can be adjusted.

If operation is knock limited, it would be possible to trade off turbocharging with compression ratio. Higher turbocharging with increased downsizing but decreased compression ratio may offer improved efficiency at the peak point of operation. Operation with compression ratios of 8-10 could be used with substantial turbocharging (higher than 1.5 bar absolute manifold pressure). Alternatively, higher compression ratios of at least 10 could be used with lower turbocharging. Similarly, direct injection, which results in increased tolerance to knock, may be preferred. However, direct injection may impact operation with multiple fuels. However, some fuels could be introduced into the manifold, while other fuels can be added, when needed, through direct injection. It may be possible to combine both approaches.

Figure 6:
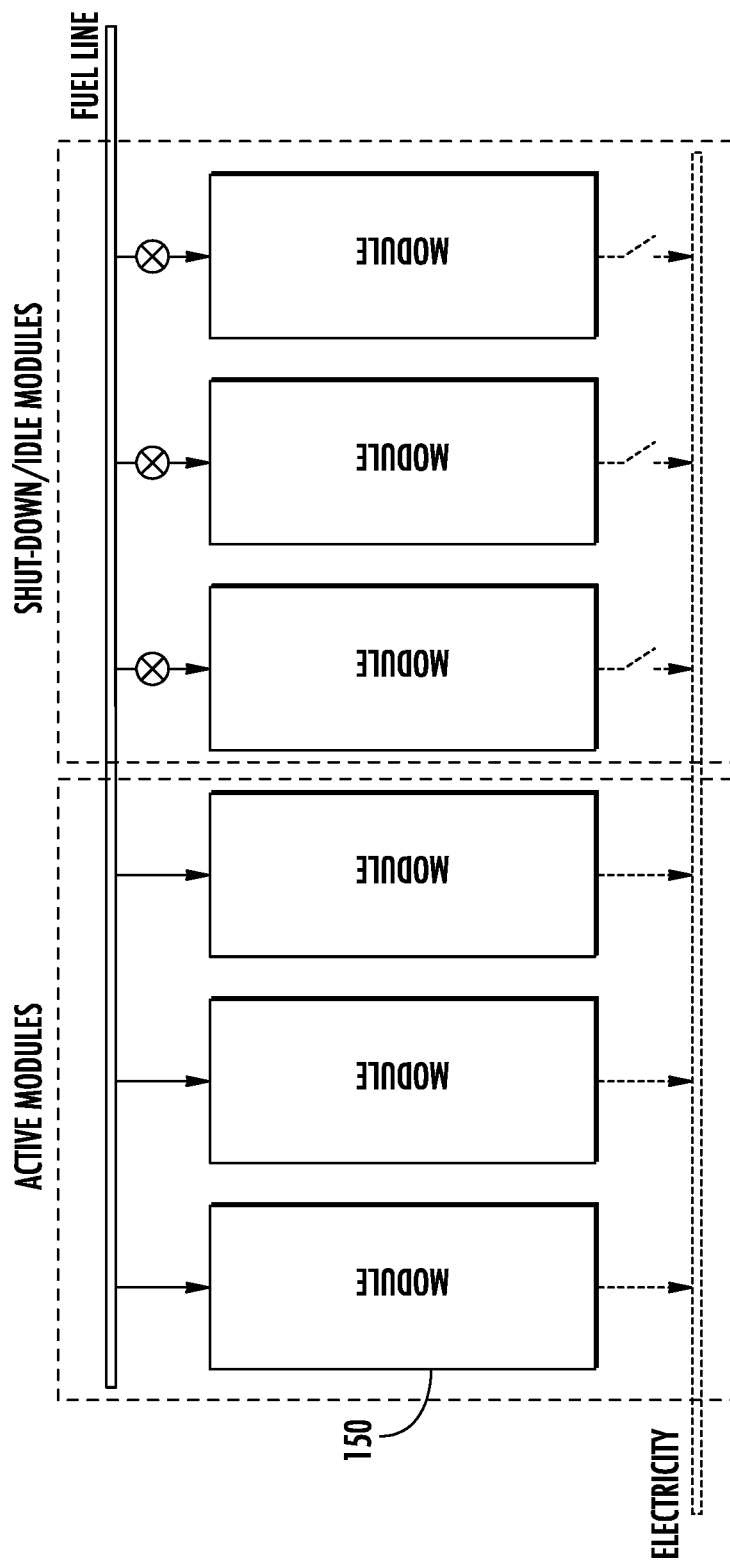
FIG. 6 shows the generation system of FIG. 5 where some of the power modules are active and others are idle.

FIG. 6 shows one method for controlling the output electricity from the generation system. As shown, some of the power modules 150 are active, producing electricity, while others are shut down, on idle (for standby, if desired). The power output from the system is reduced because only a fraction of the power modules are operating. In the power modules 150 that are operating, the engines are operating at the sweet spot, and thus, at high efficiency, and the other engines are shut down or at idle (if desired). Since the engines can be quickly started and shut down (with the cold start time being generally less than around 5 seconds), it is possible to do substantial load following using the system, without idling engines, but instead, having those engines in shut down.

The set of the power modules that are operating can be determined in order to adjust the operating time of the engines to match a maintenance schedule for the system. Scheduled maintenance, which is required infrequently in a low-capacity factor application, is carried out in the field, and may include oil and air filter changes, and spark plug changes. Major maintenance, such as engine rebuild, or engine component replacement, such as water pumps, oil pumps, timing chains or belts, may be done remotely.

By using modular approach, a truck can be used to bring a container with refurbished engine-generator units, to the site replacing the one that needs to be taken for maintenance. The container with systems in need of major maintenance may be taken to a shop specialized in this type of work. Engines may be then taken out of the container for repair, and then be placed back into it.

When a single or a small number of engines in a power module 150 fail before major maintenance schedule, these engines could be kept off. In this case, the power module produces less power, or it can compensate by increasing the power from the remaining engines, until that time when a substantial fraction of the engines is down or need scheduled maintenance.

Once the system has been operating for some time, the scheduled maintenance of the system can be staggered so that the maintenance of the power modules 150 occurs in regular intervals. In this manner, the repair shop is not overloaded and a small number of additional spare units is needed. Thus, it may be scheduled so that the time to repair a module is less than the time required to exchange a module. The staggered replacement may be especially useful for use of MAE-based generation systems where the capacity factor is greater than 5% and the engine may have to be replaced during the lifetime of their operation in the electricity generation systems Initially, all the engines in all the power modules 150 are on the same major maintenance schedule. By operating one module with a consistently higher capacity factor (during times when power demand is less than the full power capability of the set of modules), it is possible to stagger major maintenance scheduled, building some staggering between maintenance schedule for the different modules. Once the units have operated for some time, the capacity factor of the power modules 150 can be scheduled to appropriately set a regular maintenance interval between the different modules. It should be noted that the relevant time is not clock-time, but engine on-time.

Staggered operation for one hundred container modules could be carried out in the same way (e.g. ten container modules being replaced with ten container modules at one time instead of one container module). The same fraction of total generation capability could be replaced regardless of the total number container modules.

The staggered replacement may be especially useful for use of MAE-based generation systems where the capacity factor is greater than 5% and the engines may have to be replaced during the lifetime of their operation in the electricity generation systems because the number of hours the engine is operated exceeds its life time.

Although the system shown in FIG. 6 shows entire power modules 150 either operating at full load or shut down, it is also possible to shut down some of the engines inside an operating power module 150. Finer variation of the power produced by the system can thus be achieved. The operation of the engine, when on, at or near the sweet spot in order to maximize efficiency is preferred with adjustment of the total generating system power level by varying the number of modules and/or the number of engines inside a power module 150 that are operating at any given time.

The total generation system is a multiplexed set of container modules, each of which is a multiplexed set of engine-generator units. A 100 MW MAE generator system can thus contain a thousand or more engine-generator units. An MAE-based generation system that uses more than 100 engine-generator units can be referred to as generation system that uses a "highly-multiplexed" or a "massively-multiplexed" number of engine-generator units.

Because of wide range of fuels that can be used and the wide range of power outputs that can be provided, there may be considerably more flexibility in siting a MAE-based system than an OCGT. This flexibility can facilitate more distributed siting of backup power units where the electricity that they produce could be used to meet either the needs of a large grid or the needs of a smaller region that has lost electricity due to a disruption in transmission of electricity to that region. MAE-based systems could be used to provide power for microgrids, local grids or grids and could be readily switched between these needs. Moreover, because they are readily transportable and easy to commission the MAE-based generations systems could be moved to facilitate grid reconfiguration.

Transient Performance

A further advantage of an MAE system is fast engine startup and shutdown relative to an OCGT (<10 seconds and preferably <5 seconds as compared to >600 seconds for an OCGT). The fast MAE startup time is made possible by the relatively small size of the individual engine-generator units. Small inertia of the moving components, small thermal heat capacity and good lubrication are attractive features of MAE-based generation systems that result in improved start-up transient performance, as opposed to large internal combustion engines or gas turbines.

The fast startup time enables the advantageous low cost combination of MAE-based systems with low cost, low energy storage batteries that provide high power for very rapid (e.g. less than one second) response for frequency stability applications. When the rapid, such as, for example, 5 second, response of MAE-based generation (during engine startup) is still not rapid enough, the engines can be used to recharge low cost, high power batteries (or flywheels or supercapacitors) which would provide very rapid response. MAE-based generation systems would require much less of this battery capability than OCGTs. The response time of the engines can be much faster, around 0.5 second, when engines are already operating. During the transition, the power of the operating engines may depart from the sweet spot, returning to it when the transient disappears.

The MAE-based systems in combination with low cost, high power batteries could thus also be an alternative to battery energy storage for rapid response applications including spinning reserve. In addition to providing rapid response supplementary power for spinning reserve, MAE generation systems could provide a spinning reserve means for rapidly shedding excess power in a grid system. The engine-generator units may be operated in a mode where excess electrical power is dissipated in the unfueled engines. The engine brake is created by letting air out the cylinder during the compression stroke when the engine does work on the gas; opening the exhaust valves during the compression stroke; and expelling the compressed gases, which results in engine requiring power for pulling against a vacuum in the expansion stroke. This process is similar to that used in on-road applications by trucks, called "Jake-braking". The process makes loud noises, which may require additional sound proofing or limit its applications in regions with close abutters.

An additional advantage of MAE-based generation is that the use of automotive size engines assures rapid startup when needed whereas this can be an issue with large reciprocating engines (e.g. engines in the 1 to 10 MW range). This can be an important advantage for MAE use in backup power for hospitals, data centers and other organizations that need assured power.

The same multiplexed engine and container modules that are described for automotive SI engines could be used for employing mass produced vehicular engines that use compression ignition of diesel fuel for a variety of applications including backup power. These engines could use both SCR exhaust treatment with diesel exhaust fluid (DEF) to address NOx emissions and diesel particulate filters to reduce particulate emissions.

Illustrative Costs

An initial assessment, which is described below, indicates that generation systems using mass-produced automotive engines in combination with low-cost generator components that are mass produced for electric cars have a very low installed cost per kW (around $100/kW). This cost/KW is around 15% of the cost of open cycle gas turbines (OCGT) that are presently used for peaking and have an installed cost of around $700/kW.

The low cost advantage of MAE-based systems can be even greater when they are compared to batteries if batteries were to be used for long duration electricity supply (such as 10 to more than 100 hours). This is because the battery cost per KW increases linearly with the time of storage. For example, an illustrative cost per kW for use of a present Li-ion energy storage battery (with a cost of $180/kWh) to provide power for a duration of 48 hours would be around $8600/kW in comparison to around $100/kW for an MAE-based system. Even with large potential future cost reductions, batteries would still have a large cost/KW disadvantage relative to an MAE system for long duration applications.

Table 1 shows illustrative costs for an MAE-based generation system using different fuels for operation at a capacity factor of 2.5%. Table 1 illustrates the cost of electricity from an MAE generation system in comparison to battery storage at a present cost of $180/kWhr and to use of an OCGT. The capacity factor is 2.5% and the duration of use is 48 hours. The cost of equipment is annualized over ten years. The cost of the fuels is assumed to be the present $3/MMBTU for natural gas; a future cost of $9/MMBTU for hydrogen from natural gas+ccs; the present cost of $20/MMBTU for corn-based ethanol: and a potential future cost of $30/MMBTU for electrolyzer hydrogen. Costs for an OCGT and a battery system are shown for comparison. An MAE-based system can provide a delivered cost of electricity from low carbon fuels (hydrogen, ethanol) that is comparable to or less than the cost of electricity from an OCGT using natural gas.

TABLE 1

| | battery $180/kW hr | OCGT | | | MAE | | | |
| --- | --- | --- | --- | --- | --- | --- | --- | --- |
| | | NG | H2 NG+CCS | H2 Electrolysis | NG | H2 NG+CCS | H2 Electrolysis | Ethanol |
| Cost of equipment $/kW | 8640 | 700 | | | 100 | | | |
| Annualized cost $/kW | 864 | 70 | | | 10 | | | |
| 2.5% CF, annual hours | 219 | 219 | | | 219 | | | |
| CAPEX, $/MW hr | 3945 | 320 | 320 | 320 | 46 | 46 | 46 | 46 |
| Cost of fuel $/MWe hr | 30 | 26 | 77 | 343 | 26 | 77 | 343 | 171 |
| Combined capital and fuel costs of Delivered electricity, $/MW hr | 3975 | 345 | 397 | 662 | 71 | 123 | 389 | 217 |

In addition to lower CAPEX (capital expense) cost per MWhr, MAE-based generation systems could provide low-carbon electricity at lower cost than OCGT systems by being able to readily use a wide range of low carbon fuels not possible with an OCGT. For example, automotive engines can readily use ethanol, methanol or ammonia in contrast to an OCGT. Operation of an OCGT to allow on-demand switching between a wide range of fuels is difficult and, although it is being investigated, has not yet been demonstrated. For example, an MAE-based system could use present corn-based ethanol which has a substantially lower delivered electricity cost than hydrogen from electrolysis, in addition to easier storage. An illustrative number for the present medium cost of delivered hydrogen in the US is $90/MMBTU based on a $75/MMBTU production cost [ICCT] and an estimated cost of $15/MMBTU for storage.

Thus, while the MAE-based generation systems have the greatest CAPEX cost advantage relative to OCGT systems at low capacity factors, they could also provide an important delivered electricity cost advantage at substantially higher capacity factor operation (such as, for example, 20%) This cost advantage would mainly result from greater flexibility for fuel switching relative to present OCGT technology. For example, an MAE-based generation system could be readily switched to use ethanol as a low carbon fuel if low carbon hydrogen was too expensive or not available.

Possibilities for future low carbon liquid fuels include methanol, ethanol or ammonia produced by thermal chemical conversion waste and biomass sources.

Figure 7:
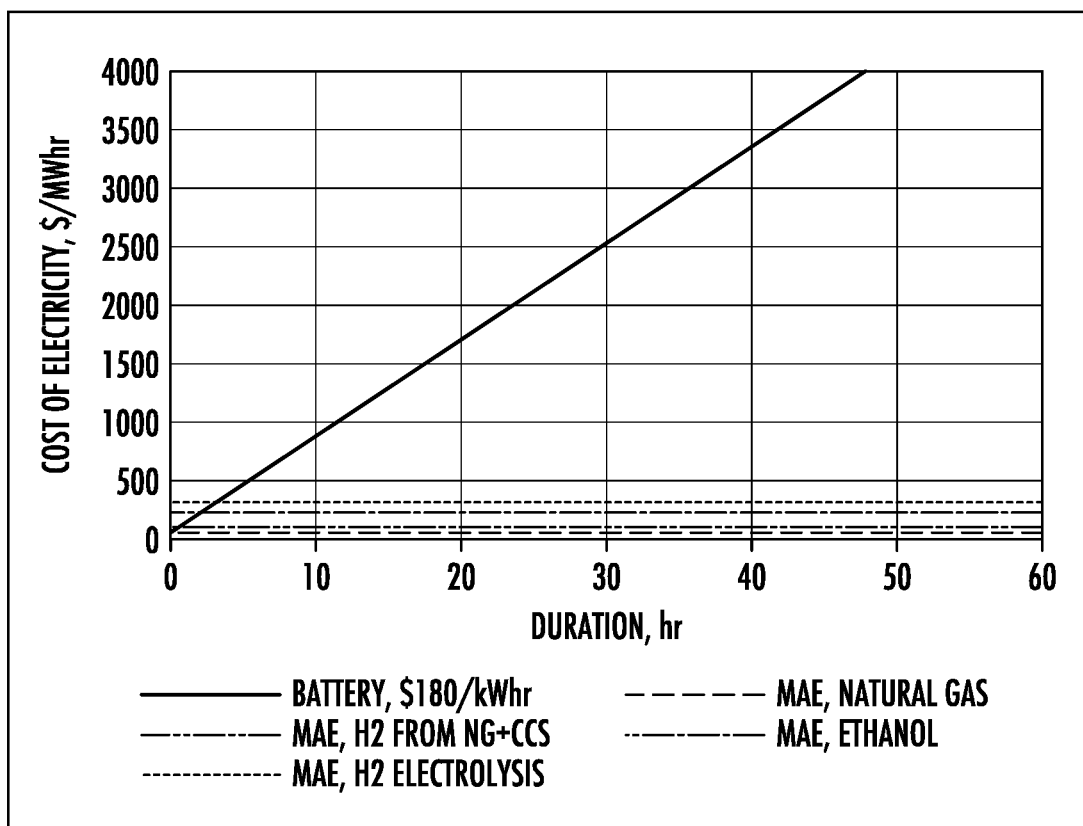
FIG. 7 shows the illustrative delivered cost of electricity for battery and MAE-based systems as a function of duration for various fuels.

FIG. 7 shows illustrative costs of delivered electricity as a function of duration for a battery with a present stored energy cost of $180/kWhr and an MAE-based system using various fuels. These costs are based on the parameters used in Table 1. The capacity factor is assumed to be 2.5%. The cost of delivered electricity from battery energy storage increases linearly with duration and for a duration of 4 hours is around ten times higher than the illustrative present renewable electricity cost. The cost of electricity from MAE-based systems is independent of duration and can be affordable for extended durations even when expensive fuel (e.g. hydrogen from electrolysis) is used. FIG. 7 also shows an illustration of how an MAE-based generation system using natural gas may provide electricity at lower cost than present battery technologies for durations as short as around 30 minutes.

For comparable costs of the electricity for storage in batteries and the fuel for use in MAE-based systems (which is the case for a low cost fuel such as natural gas), an MAE-based system could provide lower cost delivered electricity supply shortfalls of all durations assuming that the MAE-based system is required for extended duration supply shortfalls and no CAPEX charges are assigned for short duration use. However, although a battery system would not be needed for energy storage, it may be needed to provide very rapid power for some applications until the engines warm up.

For a high cost fuel, such as hydrogen from electrolysis, the lowest cost system could be a combination of battery energy and an MAE-based energy storage where electricity supply shortfalls up to a certain duration are addressed by the battery system and an MAE-based system is used for supply shortages above that duration. The duration at which this change would occur would depend on the difference between the electricity price and the fuel cost. It could also depend on capacity factor since higher capacity factor increases the importance of fuel cost relative to capital cost.

One option for using an MAE-based generation system in conjunction with battery power may be to add it to existing battery storage sites to provide capability, when needed to insure grid reliability for extended durations (such as, for example, 2 days). MAE-based systems could also be used to provide modest duration extensions of short duration storage capability (e.g. from 4 hrs to 8 hrs). Another use may be to generally augment short term supply (such as, for example, under 4 hrs) capability. The MAE-based systems could initially be fueled with natural gas and then transition to electrolyzer hydrogen as it becomes available. They may also be fueled with ethanol, starting with corn-based ethanol and transitioning to lower carbon ethanol as it becomes available. MAE-based systems may also be fueled with propane or gasoline.

More broadly, MAE-based generation could be used in combination with battery power so as to meet additional grid reliability needs by providing power for longer duration, less frequent electricity shortfalls. The battery power may be used for shorter duration, higher capacity factor operation whereas the MAE-based generation systems may be used for lower capacity factor needs. The conditions at which the MAE-based systems would take over may depend in part on the cost of the fuel used by the MAE-based systems. For example, MAE-based systems may take over for durations which exceed 4 hours (due to the limitations of the battery) and capacity factors which are lower than 10% when fueled with natural gas and for longer durations and/or lower capacity factors with a more expensive fuel.

Short duration batteries could be used to provide nearly instantaneous power adjustments during times when the MAE-based system total power is varying, such as startup. The use of batteries/MAE system could thus help address the need of spinning reserve.

A further application may be to increase the low end of the short duration range (which may be, for example 1 hour) capability of an existing battery energy storage site by using a given amount of installed battery energy storage capability (kWhr) to produce more power in a shorter duration (e.g. for up 1 hour rather than up to a 4 hour duration). The increased short duration capability that may be enabled by an MAE-based system may be provided for very short duration needs, such as for providing more spinning reserve. The power that would then be needed for longer duration battery capability (e.g. 4 hours) that has been given up could be taken over by MAE-based systems. Moreover, the addition of the MAE-based generation system to an existing battery storage system can extend supplementary power duration capability through a range of durations that is 100 hours or more.

The extent to which an MAE-based system can enable the stored battery energy is used to produce more power for a shorter duration may be varied in real time. It may be determined by load balancing needs, the price for electricity for various applications and by the cost of fuel for the MAE-based system. It may be facilitated by the large power production range over which there is high efficiency power production, small power module size and rapid response of MAE-based systems.

The MAE-based systems may also be attractive for short duration electricity supply shortfalls in cases where there is not an existing high energy storage system. Even when the engines in the MAE-based system are cold and the MAE-based system response time is in the 5 to 10 second, the MAE-based system could handle electricity supply shortfall durations that range from very short duration (e.g. in the 10-30 second range) to very long durations of 100 hours or more. For electricity supply shortfalls that require a response time that is shorter than around 10 seconds, low cost, high power low energy storage batteries may be employed. Moreover, when the engines are warmed up and their response time decreases, they could provide additional very short response time (less than 1 second) to the very short duration capability provided by low cost, high power, low energy storage batteries Cost Basis and Operational Features of MAE Generation Systems An illustrative multiplexed automobile engine (MAE) generation power module could use nine MAE engines that each produce 170 kW of electricity to provide an electricity capability of 1.5 MW. Such a module could be installed into a standardized container that can be easily hauled to and placed at the deployment site. Alternatively, the power module could be installed in a wheeled trailer that is left at the site. In either case, the size and weight of the power module (which may be, for example, 20 tons or less) could fall well below standard limits for highway trucking, enabling low-cost transport. The capacity of a system based on such modules would be easily scalable (e.g. with 10 power modules providing 15 MW and 100 power modules providing 150 MW). Variation of the power level would be achieved by varying the number of power modules or engine-generator units within a power module in operation at any time, allowing units that are operating to remain at or near their "sweet spot."

A representative major service (or replacement) life of the MAE-based generators would likely be at least 6000 hours given a less demanding duty cycle than typical in automotive applications. In the electric power application discussed here, these engines may operate mainly at steady part load for longer periods of time with less cycles than in automobile applications, thus facilitating a longer lifetime. A 6000 hr service life corresponds to around 250,000 miles of engine operation in an automobile engine that is designed for long life and is properly maintained.

A 6000 hr service life would provide over 13 years of life at a 5% capacity factor (438 hrs per year) and over 26 years of life for a 2.5% capacity factor (219 hrs per year). Thus, for capacity factors of 5% or less, these engines can be expected to last for more than 10 years. If it is necessary for engines to be replaced due to higher capacity factor operation (e.g. greater than 5%), they could be replaced by staggered return of container modules to a central facility of major maintenance or engine replacement. This approach would increase the lifetime of the generation by another period which is longer than 10 years at a rough increase in operating expense that adds a cost that is rough half of the total CAPEX.

The 6000 hr MAE unit service life is much shorter than that of an OGCT, which can exceed 80,000 hours (e.g. 4000 hours/year service for 20+ years). However, most OCGTs are operated at a much lower average number of hours per year and annual capacity factor (CF); and the long service life of OCGT is of limited value in low-CF applications.

A preliminary assessment of the total of the assembled costs, where assembled costs are costs that represent the costs that are incorporated in the selling price, of an MAE-based generator unit is in the range of $60/kW to $75/kW. The only NRE (Non-Recurrent Engineering) required is for assembling a small number of components together (engine, generator, controls), with the bulk of the NRE of the main components, as well as the cost reduction of those components, already performed by the automobile manufacturers. Based on automotive system pricing, the price for a MAE-based power generation system would be less than $100/kW, which is around one seventh of the price per kW of an OCGT.

One basis for this assembled cost estimate is the recent MIT Future of Mobility Study (FOM). Table 2 below presents illustrative costs for a MAE-based powered generator unit sized at roughly 100 kW of electric power that can be fueled with hydrogen, natural gas, and other fuels or fuel mixtures. The MIT FOM study provides estimated component cost breakdowns for battery electric vehicles (BEV) and conventional internal combustion engine (ICE) vehicles produced at scale. Based on these breakdowns, it is possible to estimate the costs per kW of a mass-produced generator set producing around 100 kW. The MIT FOM study estimates the power train cost of an ICE vehicle at about $4500, which includes the cost of the transmission ($600) and ECU and sensors ($310) required for drivability but not required for the engine generator application. For an EV, the FOM study estimates that the cost of electric propulsion components (electric drive/power converter and motor/generator) at around $3500/kW. Using this information together with the IC engine information, the implied cost per kW of electric power from this information is $73/kW. Use of higher power engine to produce 150 kW could bring this cost down to around $70/kW.

Another basis for cost is a UBS electric vehicle teardown analysis. Using this analysis, a preliminary assessment indicates that the engine and generator systems components could have a total assembled OEM component cost per kilowatt of electric power that is around $60/kW. This total component cost number similar to the $73/kW number in Table 2.

TABLE 2

Illustrative Costs of MAE-based powered generator units (~100 kW)

| | IC based |
|---|---|
| powertrain (includingexhaust) | $4,500 |
| transmission/ECU/sensors | −$910 |
| Power source (ICE, FC) | $3,590 |
| Electric Propulsion components | $3,500 |
| Fuel system | $200 |
| System total cost | $7,290 |
| System cost ($/kW) | $73 |

Using the MIT Insights into the Future of Mobility study, a preliminary estimate of the assembled cost of a 150 kW MAE-based generator unit is around $70/kW. An average of the result from the UBS study and this number gives a cost of $65/kW for an engine-generator unit. Adding on the cost of multiplexing the engine generator units and an EPC multiplier of 1.2 would give an estimated installed cost of $100/kW for an MAE electricity generation system. This cost is less than 15% of the illustrative $700/kWh installed cost of an OCGT unit.

It is assumed that the EPC (engineering procurement construction) cost factors for the MAE-based system are modest (~1.2). The main components are mass produced for other applications and their costs are low. There is required non-recurring engineering for optimal assembly of the components, but these modest costs will be absorbed in a large number of units (a 30 MW plant could have 300 engine-generator units). The low cost factors would result from the process of manufacturing the containers with the engine-generator units, and the low cost of construction at the site. Because of the large number of containers and commercially available mass-produced engine-generators, the costs factor for assembling the containers would be small. The construction at the site is minimal and includes connecting the fuel to the container, connecting power produced by the power modules to the substation, and the cost of a prepared parking lot. These costs have been included in the cost projection of $100/kW that is compared to the "overnight" cost of a typical OCGT (which produces power in the 30 to 700 MW range).

A MAE-based container power module system would require more space than a small gas turbine but would be much easier to transport. An example of a small gas turbine that could be housed in a single trailer size container is a 6 MW unit. An illustrative system of four 1.5 MAE container modules with each having a weight of 30 tons would be needed be needed to provide the same power. However, the trailer-size 6 MW turbine unit weights around 70 tons and could not be hauled by truck unless a special permit were provided. Moreover, small gas turbines have generally not been used for grid applications because of their higher cost per kW than larger OCGT turbines ((which are in the 50 to 700 MW range).

A container module MAE-based system is somewhat analogous to a battery system which uses containers. However, an illustrative MAE-based system could use roughly 95% fewer containers than a battery system if the battery system were to be used to provide electricity for an illustrative long duration of 40 hours. As an example, an SDG&E (San Diego Gas and Electric) battery storage system that provides 30 MW for 4 hrs (120,000 kWh) employs approximately 400,000 batteries in 20,000 modules placed in 24 containers (where each container weighs around 30 tons). Increasing this battery system to provide electricity for 40 hrs would require approximately 240 containers.

In contrast, an illustrative MAE-based system would require around 20 containers (each providing 1.5 MW of power) to provide 30 MW. The total weight of the illustrative MAE system (around 600 tons) would be around 5% of the weight of the battery system. In general, an MAE-based system would weigh less than 10% of a battery system that produces the same power for a duration of 48 hrs or more.

The MAE generator units can be used to produce either AC or DC power. AC and DC generation each have advantages and disadvantages. One potentially important advantage of DC generation is the ability of the engine driving the generator to operate at optimal revolutions per minute (RPM), maximizing its efficiency. The varying frequency of the electricity that results from removing the constraint on the engine speed is accommodated by conversion into DC. With AC generation, the maximum rpm of the engines is limited to 3600 rpm which is the maximum rpm at which 60 Hz AC can be generated without the use of a gear box (at this rpm, two poles are used in the generator; a smaller number cannot be employed). Limiting the rpm to 3600 rpm limits the power provided by the engine to roughly 60% of its maximum and thus limits the option of lowering the cost per kW by operation at the highest available power level. This can remove the option of lowering the cost per kW by operation at higher power, especially if high power demand is infrequently needed for short periods of time. Another advantage of DC is the ability use generator hardware based on electric vehicle motors that can run on or generate DC power One disadvantage of DC generation is that it must at some point be converted into AC for introducing into the grid, which can add significant cost. On the other hand, renewable distributed resources, such as solar and wind power, generate DC power which needs to be converted into AC. If the engine generator system is co-located with a DC source it could make substantial use of the same DC to AC conversion system (when the renewable energy resource is unavailable), thereby reducing cost. It is also the case that some of the limitations of AC noted in the previous paragraph might be overcome through the use of gearboxes that enable the engine and generator to operate at different speeds.

Figure 8:
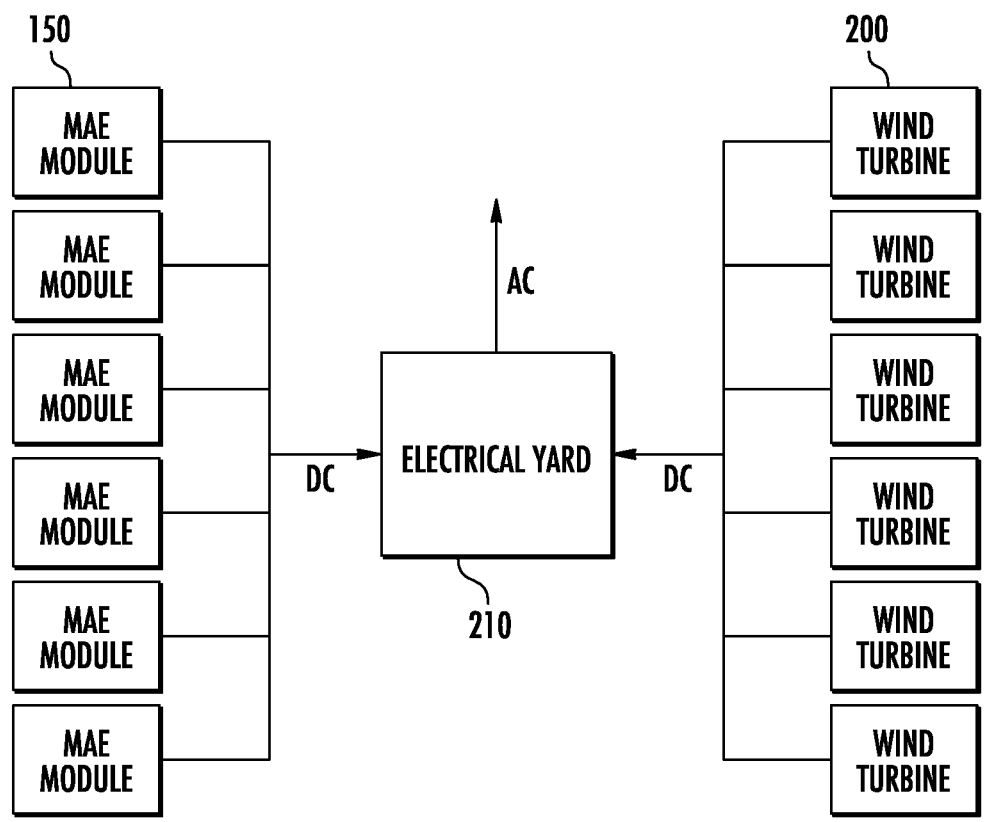
FIG. 8 shows a system where a set of renewable sources is combined with a set of MAE power modules that are generating DC power.

FIG. 8 shows electricity sources 200 combined with a set of MAE-based power modules 150 that are generating DC power. In FIG. 8, the electricity sources 200 are assumed to be wind turbines, but these electricity sources could be any other type of renewable (including solar, thermal storage), or battery energy storage. The switch yard 210 to convert DC to AC may be shared between the two or more sources of electricity (e.g., an MAE generation system, wind or solar power, or a battery), thereby decreasing the cost of implementing the MAE generation system.

Figure 9:
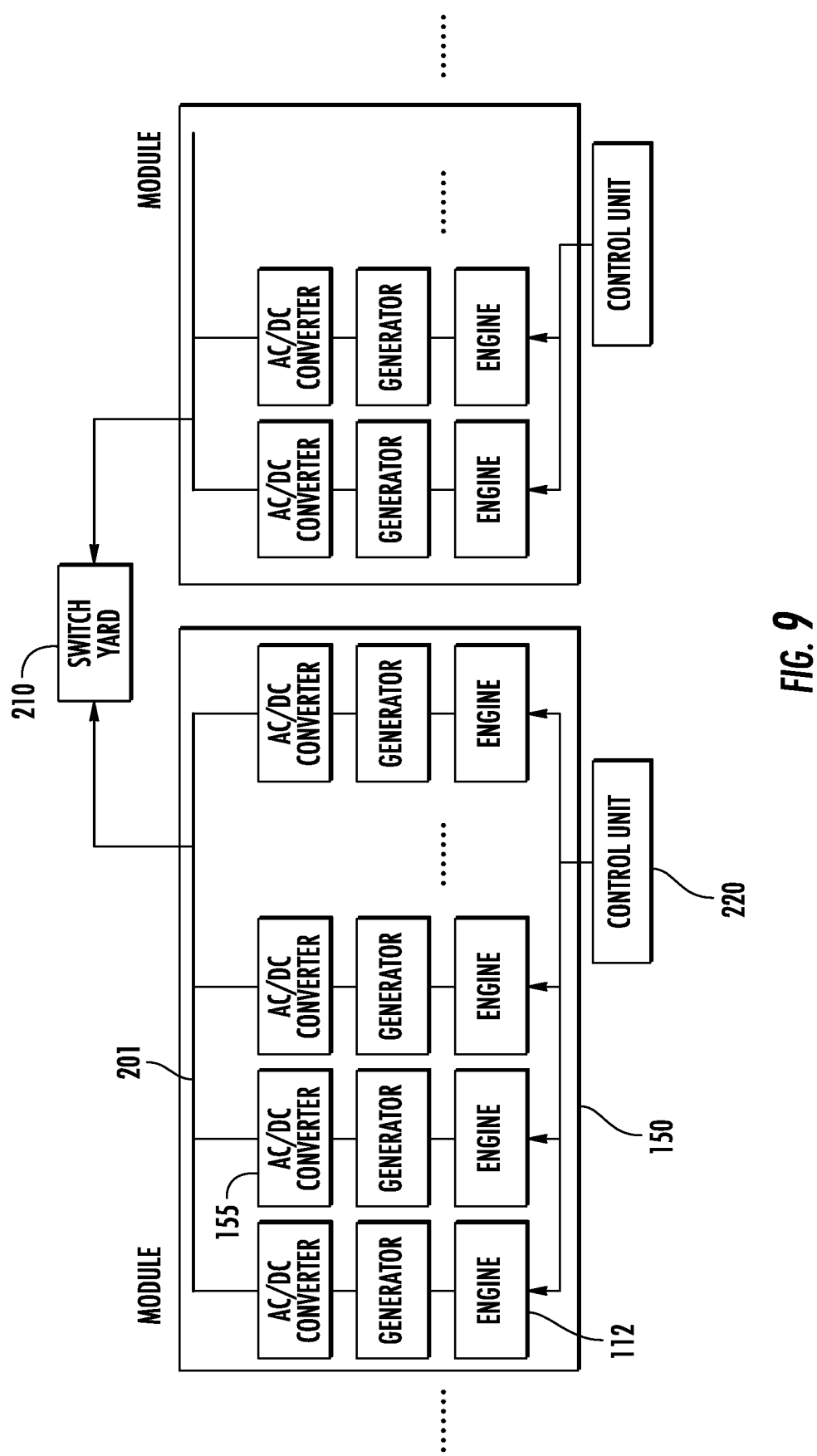
FIG. 9 shows an embodiment where multiple power modules are connected through a DC bus to the switch yard.

FIG. 9 shows an embodiment where multiple power modules 150 are connected through a DC bus 201 to the switch yard 210. In the figure, each engine-generator unit has an AC converter 155. The DC voltage is gathered from the engine-generator units in a power module 150, and exported to the switch yard 210. The control unit 220 determines which power modules are operating, and within each power module, which engines 112 are operating. When operating, the engines 112 operate in a narrow band around the sweet spot of the engine.

Fuel Flexibility

For very robust reliability in the case of extreme weather events such as the 2021 cold weather event in Texas, the MAE-based systems can employ SI engines that are fueled with either natural gas and a stored liquid fuel such as gasoline, ethanol or propane. These engines can rapidly switch between the uses of these fuels. The engine could be automotive flexible fuel engines that is adapted to operate on gasoline or mixtures of gasoline and a high ethanol concentration ethanol blend such as E85. Addition of natural gas to the manifold engine can be provided by fuel valves in the engine intake, or by carburation.

Alternatively, high robust systems for extreme weather outages could be achieved using modified automotive engines that are fueled with natural gas and diesel or with diesel fuel alone. When operating with natural gas and diesel fuel, the engines could be mainly fueled with natural gas where the engine would be ignited by compression ignition of the diesel fuel. These engines could use automotive SCR exhaust treatment to considerably reduce NOx levels relative to most present diesel engine-generators. However, these levels would still be around ten times greater than those from an SI engine with a three-way catalyst.

MAE-based systems using SI engines can use a wide range of liquid fuels when gaseous fuels, such as natural gas, renewable natural gas and/or hydrogen, are not available by pipeline or are not affordable. In this case, rail and/or truck transportation of liquid fuels would be used. The advantages and disadvantages of some of the liquid fuel options are discussed below.

Gasoline is the most widely available and lowest cost liquid fuel that could be employed in MAE-based system. It can be stored on site in the same type of tank that is used at automobile service stations for ~3 months or as long 1-3 years if using stabilizer or controlling potential contamination and preventing evaporation. In contrast to diesel fuel, gasoline has the attractive feature of producing very low local air pollution (NOx, hydrocarbons, CO and particulates) through the use of the highly effective three-way catalytic converter for gaseous emissions and the use of port fuel injected engine operation. However, gasoline has the disadvantage of not reducing greenhouse gas emissions.

Diesel fuel could also potentially be used in an MAE-based system but would require a compression ignition engine and has the air pollutant emission disadvantages as well as not being a greenhouse gas reducing fuel. Diesel does have the advantage of being storable in a building. These systems could also use modified compression ignition engines that are powered by dimethyl ether (DME), a cleaner burning fuel that can be produced from low carbon feedstocks. DME can be stored as a liquid under modest pressures. Alternative, it can be stored as a liquid at reduced temperature, at atmospheric pressure (below −24 C).

Ethanol in the form of E100 or in high concentration with another liquid such as an ethanol-gasoline mixture such as E85 could provide advantages as a liquid fuel option. It is a presently available in U.S. and can provide reduced greenhouse gas. Annual corn-based ethanol production in the United States is presently close to 15 billion gallons according to the U.S. Energy Information Administration.

The California Air Resources Board (CARE) has designated corn-based ethanol as a fuel that reduces greenhouse gas emissions. The carbon intensity of ethanol can be presently 30% lower than gasoline or diesel based on the Argonne National Laboratory GREET lifecycle code. The present retail price of corn-based ethanol, excluding taxes, is around $20/GJ, which is about 15% more expensive than gasoline. An additional advantage of ethanol is its much higher flash temperature than gasoline, which could facilitate its storage inside buildings.

There are several pathways to further reduce the carbon intensity of ethanol. One option is to carbon capture and sequestration (CCS) of the relatively pure $CO_2$ emissions that are emitted in corn-based ethanol production. The enhanced tax credit for carbon capture under Section 45Q enacted in 2018 has already spurred the announcement of several CCS projects at ethanol plants. Other options for reducing the carbon intensity of ethanol (which can also be used to produce methanol) include production of ethanol from Municipal Solid Waste ((MSW), agricultural waste or forestry waste using thermal chemical and/or biochemical conversion processes. Use of MSW as a feedstock can be especially attractive because of its negative feedstock cost (a waste disposal fee) and the elimination of fugitive methane emissions from landfills.

There is already a substantial infrastructure and distribution network for ethanol in the United States in order to support the blending of ethanol into gasoline. Since ethanol-blended gasoline cannot be moved through petroleum product pipelines, this infrastructure extends to every U.S. product terminal, so that tanker trucks can load both ethanol and gasoline blendstock that is "splash blended" into the E10 or E15 gasoline that is delivered to retail stations.

As an illustrative example, a 100 MW MAE-based system operated at a 5% capacity factor would use roughly 4 million gallons per year, corresponding to around 500 deliveries per year of 8,000 gallons each using current road tankers. 250 such systems with a combined 25 GW power capacity would consume about one billion gallons of ethanol at a 5% annual CF. Thus, even at scale, fueling low-CF generators with ethanol would use modest volumes relative to the capabilities of existing ethanol infrastructure.

In other countries, such as Brazil, hydrous ethanol produced from sugar is qualified as a fuel. Sugar-based ethanol is a major transportation fuel in Brazil and could potentially be produced and used in other countries, especially in Africa and Asia.

MAE-based systems that are powered by ethanol can be readily operated in a flexible fuel mode so as to use gasoline if affordable ethanol is not available. The ethanol and gasoline (in various relative amounts) can be stored in the same onsite tank. Tanks in existing or no longer operational service stations could be used for MAE engine generator stations. These engines could be configured to operate on natural gas if it is available, with ethanol or gasoline as a backup.

Another fuel option is use of methanol or butanol. Methanol is the most efficiently made and lowest cost fuel that can be produced from thermal chemical conversion of municipal solid waste (MSW), agricultural waste or forestry waste. It can also be produced from natural gas or biogas. Conversion of natural gas into methanol could be attractive as a means to make use of natural gas that would otherwise be vented or flared. Butanol is a fuel that is very similar to gasoline, and is also being considered as a low carbon fuel.

Long term storage of alcohol-based fuels does not have the biodegradation issue of petroleum-based fuels (since at high concentrations, alcohol fuels are can be considered a disinfectant).

Using fueling with existing fuels, such as ethanol, gasoline, propane or natural gas, MAE-based low emissions generation systems could be located near electricity consumers to provide low cost grid reliability protection from outages caused by distribution interruption of power as well as those caused by interruption in power generation and transmission. The small power levels of MAE-based power modules (e.g. 1-2 MW maximum power capability), their combination in a system containing an adjustable number of these power modules and their multiple fuel capability can insure siting in a wide range of locations. The MAE-based system could be configured so that they could provide electricity to the grid, to a local microgrid or at individual customer sites (e.g. data centers, hospitals, financial companies) depending on the need.

In addition, a potential longer term option is the use of ammonia as a liquid means to store hydrogen without production of $CO_2$ when combusted. Ammonia can be used as a fuel in SI (or compression ignition) internal combustion engines, although with slightly lower efficiencies compared to hydrocarbon fuels. It is liquid at room temperature under slight pressures. The storage tank, however, needs to meet more demanding structural (because of the required pressure for ammonia liquefaction) and safety requirements (because of ammonia toxicity). Alternatively, it is possible to liquefy ammonia at atmospheric pressure at reduced temperature (−33 C). Although a refrigeration system is required, the structural issue with elevated pressure in the ammonia tanks is avoided.

Figure 10:
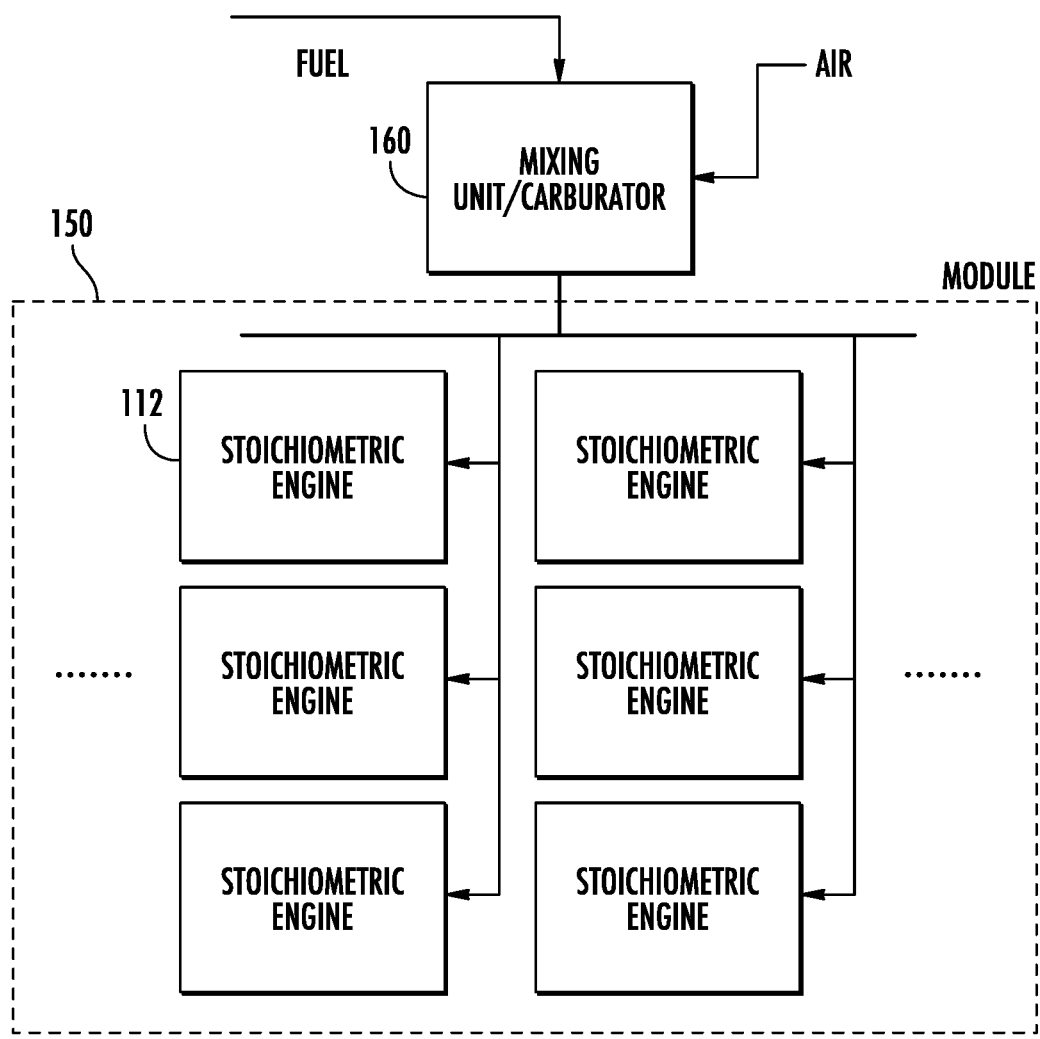
FIG. 10 shows a fueling system for a power module according to one embodiment.
Figure 11:
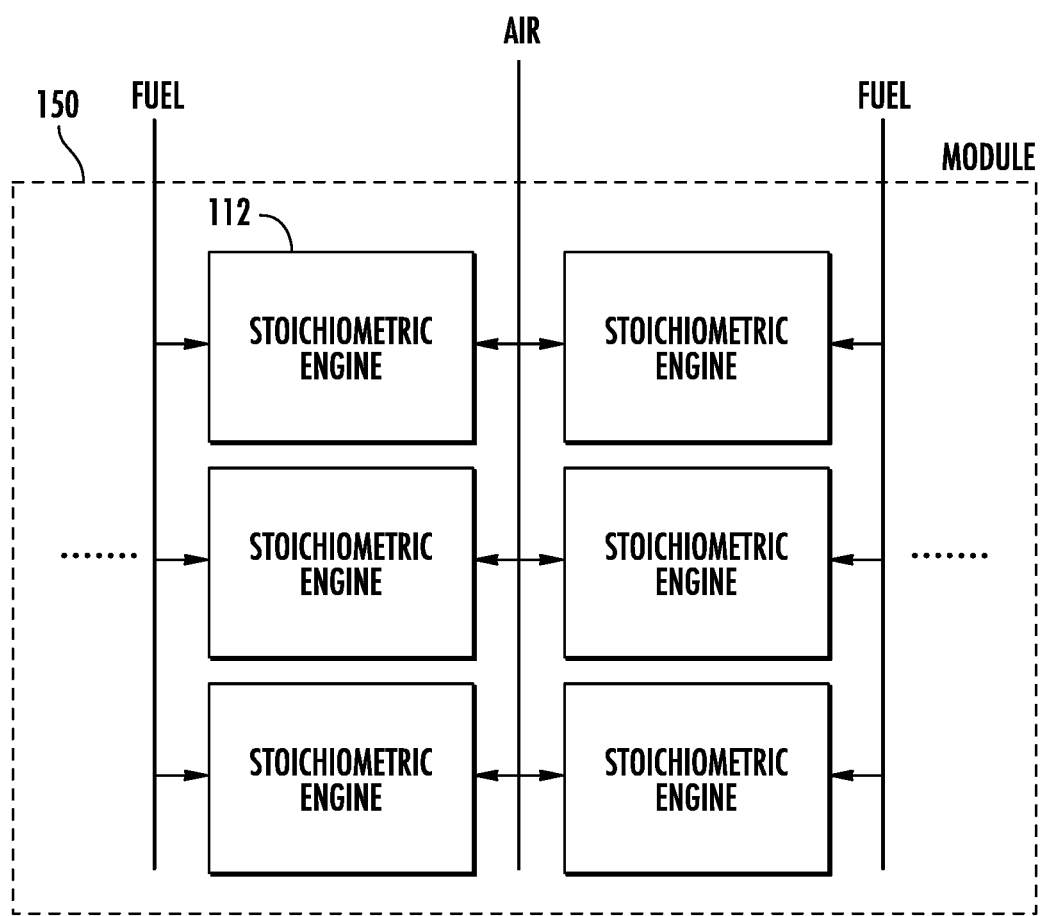
FIG. 11 shows a fueling system for a power module according to another embodiment.

A fueling system for on-demand fuel switching could comprise a combination of valve injection/carburation, port fuel and/or direct injection. In the case of gaseous fuels, it may be advantageous to introduce the fuels upstream in a common manifold for more than one engine via a mixing unit/carburetor 160 to allow for adequate mixing with the air, as shown in FIG. 10. One issue with this configuration could be that there is a larger volume of air/fuel mixture that is combustible upstream of the engine, and could raise safety concerns. To address this issue, the air/fuel pipes, can be decreased in cross section to decrease the premixed volume of fuel/air (requiring higher velocities in the lines). Alternatively, as shown in FIG. 11, each engine 112 could have its own controls to control the air/fuel mixture.

Figure 12:
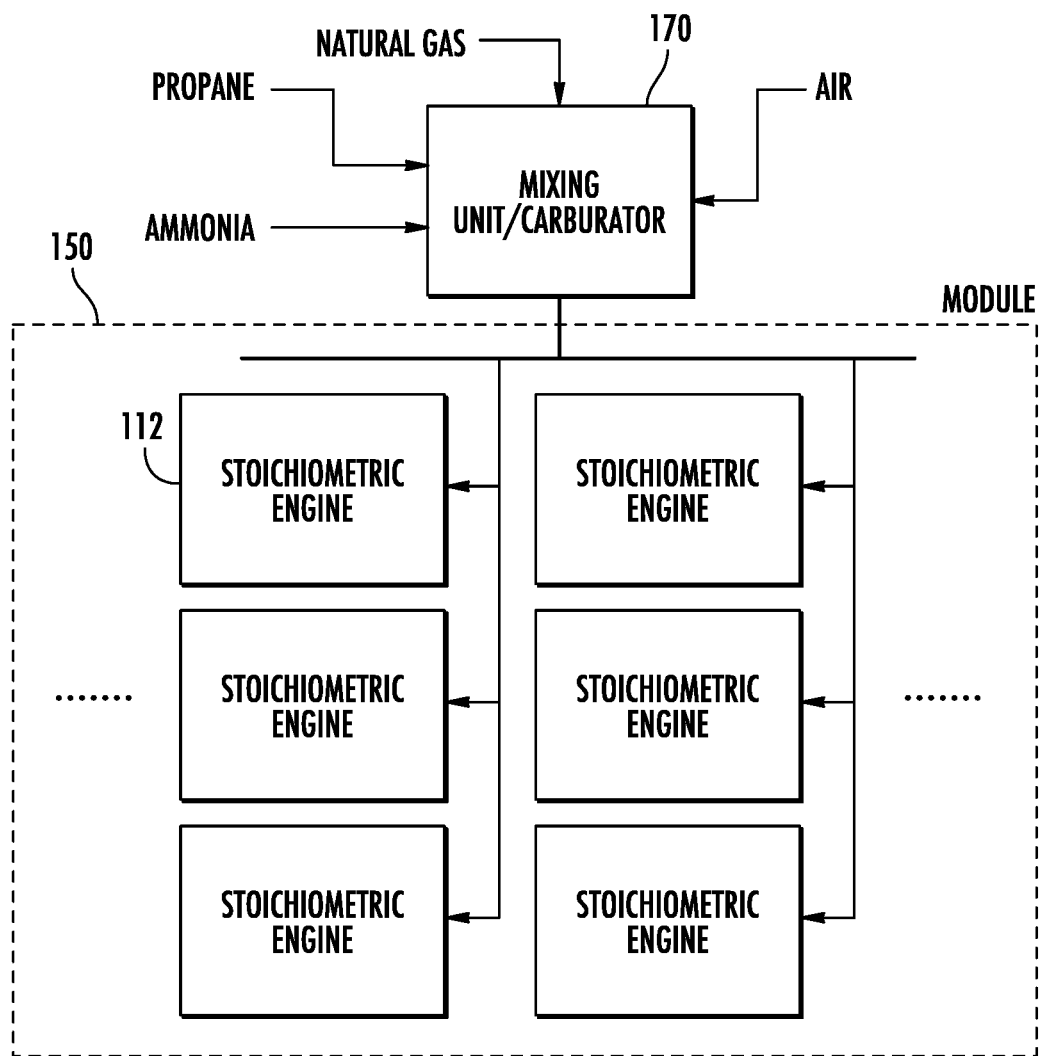
FIG. 12 shows a fueling system for a power module according to a third embodiment.

In the case of multiple fuels, it is possible to use multiple lines to introduce the fuel into the mixing unit/carburetor 170 as shown in FIG. 12. The system can have multiple lines to multiple fuel sources, each with a valve and means to control/metering the delivery of fuel. Alternative, the fuel lines may be combined upstream of a single means to control the delivery of fuel. Each fuel line has an on-off valve. It is also possible to use a means of metering the fuel using venturi effect, especially because the engines 112 operate over a narrow set of parameters, easing design of the fuel/air handling easier and enabling easier control of the engine. In the case of ammonia as the fuel, ammonia could be also be used in the aftertreatment unit for controlling NOx emissions when the exhaust is lean.

It should also be noted that a fuel cell generation system that employs low-cost mass-produced automotive fuel cells in a way that is similar to an MAE-based power system could be an alternative to an MAE-based system for use with high purity low carbon hydrogen. However, it would have much higher cost/KW than an MAE-based power system for use with natural gas and other fuels (including hydrogen-hydrocarbon mixtures, ethanol, methanol, ammonia, gasoline and propane) due to the cost of a reformer to convert fuel to hydrogen and the need for hydrogen purification. SI engines can be fueled with low purity hydrogen, while automobile fuel cells require high purity. Moreover, high purity low carbon hydrogen is not presently available for widespread delivered use and could be substantially more expensive than other fuels that can employed by an MAE-based generation system.

One advantage of using alcohols or ammonia as fuels is the possibility of running a decomposition reactor that is driven by the waste heat from the engine (the exhaust, the coolant or both). Waste energy recovery has been discussed in the past. It is possible to run an Open Rankine cycle using the liquid ammonia or alcohols. The liquid fuel is pressurized and then superheated using the engine waste heat. In addition, fuel decomposition to hydrogen rich gas is endothermic and can be carried out at relatively low temperatures, compatible to engine waste heat temperature. In the case of ammonia, the decomposition products are nitrogen and hydrogen. In the case of alcohols, the products can be hydrogen, carbon monoxide and methane, depending on the chemistry and the alcohol. The high pressure hydrogen rich gas can be expanded in a turbine (for energy recovery) or injected at pressure into the cylinder, and subsequently combusted and expanded. Because of the steady nature of the engines (no transients), operation of the exhaust waste heat recovery is much simpler than for on-road application, which need to adjust according to engine load.

MAE-Based Electricity Generation at Distributed Hydrogen Production and Storage Sites MAE-based generation systems can play an important role in using hydrogen for energy storage by producing electricity from stored hydrogen produced by wind and solar power when these variable renewable electricity (VRE) sources generate excess electricity. The stored hydrogen can be converted into electricity that is supplied to the grid when there is a shortage of electricity due to insufficient wind or solar power.

MAE-based systems can operate at relatively high efficiency (e.g. 42 to 45%) and, relative to OCGTs and fuel cells, can provide the combined advantages of a lower CAPEX; power flexibility; location flexibility; and substantial flexibility to use other fuels if the amount of stored hydrogen is not sufficient to meet the grid electricity demand. An additional advantage is the low cost/KW of an MAE-based system at low power levels in contrast to the increased cost/kW with decreased power output of the already high cost/kW of an OCGT. This can provide substantial advantages for MAE-based generation systems in more distributed deployments than an OCGT and the use of smaller hydrogen storage facilities.

In contrast to an OCGT, a more distributed lower power MAE-based generation system is better suited to storage of the relatively pure hydrogen from electrolysis in a large number of small tanks in optimized systems. By distributing the MAE's in many sites, the reliability of power distribution is increased.

Because of the low energy density of hydrogen and because the size of hydrogen tanks is limited by high pressures, considerable attention has been given to storage in large caverns. However, suitable large caverns may not be close to the wind or solar electricity generation sites thereby requiring expensive hydrogen transportation to the cavern or additional electricity transmission lines to provide power for hydrogen production at or near the cavern.

The low cost operation capability MAE-based generation systems that provide power in the 10 MW to 200 MW range can facilitate production of electricity from distributed hydrogen storage sites where the hydrogen is contained in a large group of small tanks rather than in a large cavern; and where the hydrogen storage site is located at or near a renewable electricity generation site or a transmission line that carries electricity from the renewable electricity source to the consumer.

A rough illustrative example of such a hydrogen tank storage system is the use of a hydrogen tank that can provide storage of hydrogen for 0.5 to 2 MWhr of electricity production. In this case, 25 to 100 tanks would be needed to provide one megawatt of electricity for meeting a long duration energy supply need of 50 hours. A 100 MW MAE system would then need between 2500 and 10,000 tanks. More generally, MAE-based systems would employ between 1000 and 10,000 storage tanks. The limit on hydrogen tank size is an additional motivation for a highly distributed supplemental electricity system that is better realized by engine-based electricity generation rather than by use of turbines which are larger units. It can be advantageous to use a highly distributed hydrogen storage and electricity generation systems with power capabilities of 100 MW or levels because of the large number of storage tanks that must be utilized.

One option is to locate the distributed hydrogen storage site at or near, such as within 50 miles of the renewable electricity generation power source that provides excess electricity to produce the hydrogen. In this case, the power that is produced from the stored hydrogen by use of MAE-based generation can use the same power handling equipment that is employed to connect the power from the variable renewable electricity source (VRE) source, such as AC to DC to AC conversion, to the grid and the same transmission line from the VRE source to the grid. Within this option, there could be a range of possible configurations ranging from an MAE-based generation+hydrogen storage group system for one wind turbine (producing, for example, 2 to 10 MW of dispatchable electricity) to a system for many wind turbines (e.g. producing 200 MW).

A second option is to locate the hydrogen production, storage and MAE-based generation systems at different places along the path of transporting the electricity from the VRE sources to the consumer of the electricity. These sites for $H_2$ production, $H_2$ storage and electricity generation could be spread out over a number of locations.

The MAE-based electricity generation systems that are used to produce power from stored hydrogen could also be used to produce electricity from other fuels if the stored hydrogen is not sufficient to meet the supply shortfall need of the grid. Options for this additional fuel include natural gas; low carbon hydrogen produced from sources other than electrolysis, ethanol and low carbon methanol.

The use of a hydrogen production, storage and electricity generation system that has the option of using natural gas, ethanol or some other fuel could be attractive for electricity that is generated from off shore wind. An example is the siting of this facility on land where there is transmission line from the offshore wind and there is also convenient access to natural gas. MAE-based systems can also be used at solar electricity sites that produce hydrogen.

There is thus a wide range of locations and sizes of MAE-based generation systems in the area of using electrolyzer hydrogen that is produced with grid electricity. There is also a wide range of options for adding use of fuels that are not electrolyzer produced hydrogen (by themselves or together with electrolyzer generated hydrogen). The use of MAE-based generation systems can be most advantageous when the MAE-based system that converts stored hydrogen into electricity is sited at or near (e.g., with 50 miles of) the location where the electrolyzer hydrogen is produced. Avoiding or minimizing the transportation of hydrogen can be a key factor for affordability. The approaches that are described above can also be advantageous for pathways of producing zero or low carbon hydrogen from natural gas (such as natural gas +CCS: pyrolytic production of hydrogen from natural gas), or for hydrogen production from waste and biomass sources, together with using MAE-based generation systems for converting hydrogen into supplemental electricity for load balancing or for use as an industrial feedstock or a transportation fuel.

In this way, MAE-based generation systems can facilitate use of a highly distributed hydrogen energy storage systems. These systems would use distributed sites where hydrogen is produced using electricity provided by variable renewable source, is stored in a hydrogen tank farm and is later converted into electricity when the electricity is needed. The location and power capability of the sites could be optimized for different grid needs; and, if needed, the power capability provided by these sites could be augmented by fueling the MAE-based generation systems with fuels other than electrolyzer hydrogen. The hydrogen storage sites can provide supplemental electricity that ranges, for example, from a maximum power capability of 3 MW to 300 MW. They can be sited at locations that range from being at or near wind or solar electricity generation sites, to being at various locations along transmission lines, or being in or near cities and towns.

Figure 13:
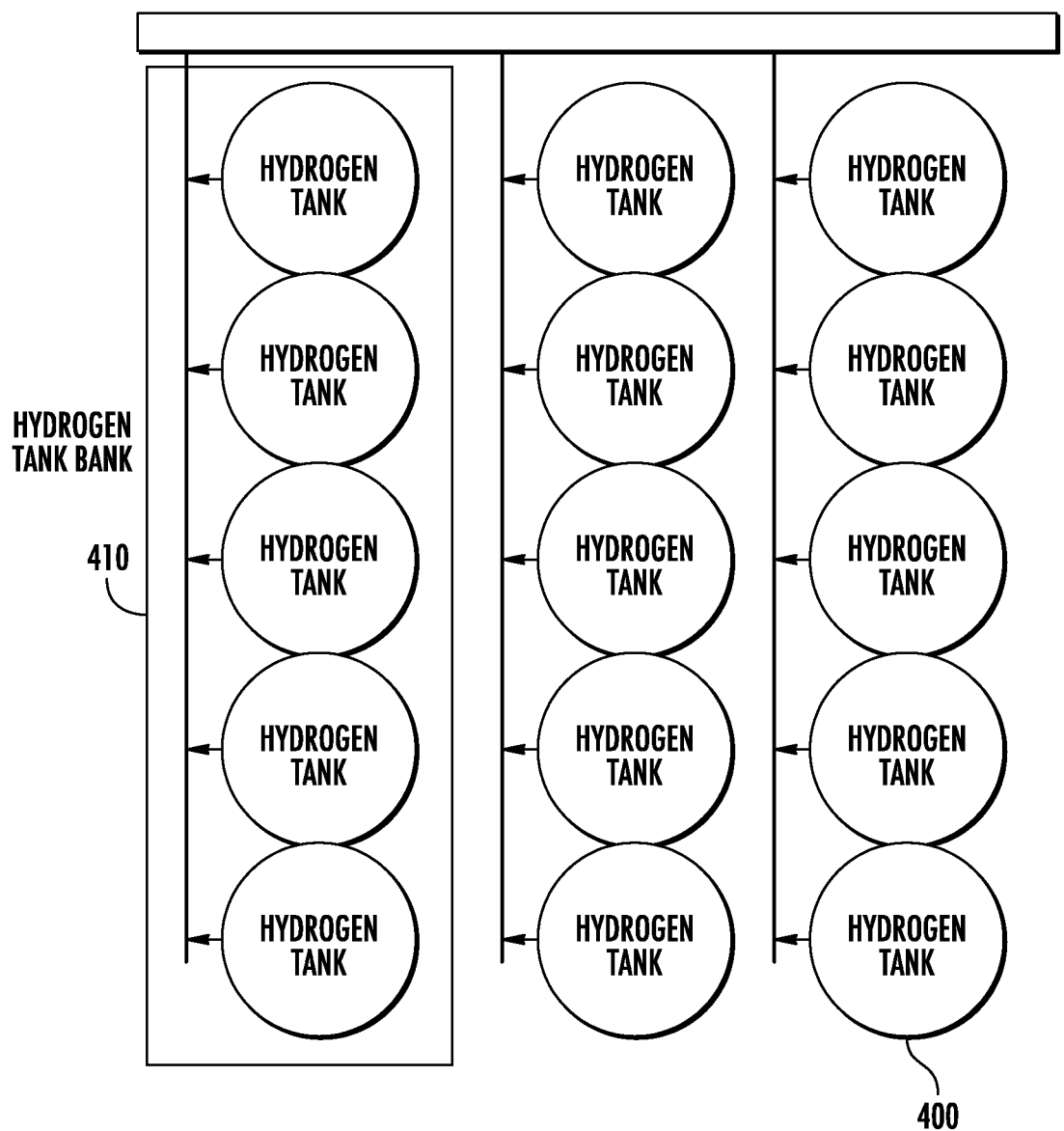
FIG. 13 shows a hydrogen bank having a plurality of tanks.

FIG. 13 shows an arrangement of a hydrogen storage facility with multiple tanks. With the projected use in transportation applications, small-scale hydrogen tanks and other hydrogen fuel components can become cheaper because of economies of mass production. In the embodiment shown in FIG. 13, multiple tanks 400 are connected in a hydrogen tank "bank" 410. Multiple banks are then connected to each other. Each bank 410 is independent of each other. Plumbing and valving can be minimized by using the tank banks 410. The tank banks 410 can be placed in separate modules and, as with the MAE-based power modules, tested and pre-commissioned at the manufacturing site, prior to being transported to the site. Minimal commissioning needs to take place at the site.

MAE-based electricity generation system could also be used to produce electricity from hydrogen stored in large caverns. Relative to gas turbine electricity generation, they could provide advantages of greater flexibility for using other fuels in addition to or as an alternative to high purity hydrogen; flexibility in adding additional power conversion capability; in being readily transportable for grid reconfiguration; and in having lower CAPEX. MAE-based electricity generation could serve as a means to add more power and provide flexibility to a hydrogen cavern storage site that mainly uses gas turbines.

A further use of distributed MAE-based systems is to provide low-carbon electricity from hydrogen gas that is produced from pyrolytic conversion of natural gas at or near the site at which at which the MAE-based generation system is located. The pyrolytic conversion produces hydrogen and elemental carbon; the elemental carbon can be much more easily disposed of than $CO_2$. This application of MAE-based generation systems could be particularly attractive for electricity generation at small power levels (e.g. less than 30 MW) where the cost/KW advantage of MAE-based generation units relative to gas turbines increases.

The hydrogen gas produced by pyrolytic conversion could be stored and then used to produce supplemental grid electricity or non-grid back up power using an MAE-based system when needed. This supplemental grid power or non-grid power (e.g., backup power) may be provided with low capacity factor operation of the MAE-based generation unit. The production of hydrogen gas could take place over a substantially longer time during a year than the production of electricity from the MAE-based unit.

The very fast startup capability (less than 10 seconds and preferably less than 5 seconds) of the MAE-based generation may also be advantageous for both grid and non-grid applications. The MAE-based units for generation of electricity from hydrogen produced from pyrolytic conversion of natural gas may be advantageous combined with low cost, high power, low energy storage batteries.

MAE-based generation systems can also be used to produce electricity from hydrogen that is stored in chemicals that are easier to store the hydrogen molecules. Several techniques have been proposed for this purpose, including methanol and ammonia and more recently, formic acid. There is a need for heat in order to recover the hydrogen, that represents a substantial fraction of the energy in the hydrogen. In the absence of waste heat that can be used for the dehydrogenation reaction, around 10% of the hydrogen needs to be combusted to generate the heat required to drive the reaction (about double for ammonia compared to methanol). Another proposed means of storing chemically the hydrogen is by the use of liquid organic hydrogen carriers. The hydrogen is chemically bound by the organic compounds. The dehydrogenation process in these chemical storage means can be carried at high pressure, eliminating some of the compression required.

MAE-based electricity generation can be used to produce electricity from these chemicals. These generation systems could be operated so as to switch between use of these fuels. For example, an MAE-based generation system could be readily operated to switch between operation on hydrogen and methanol. Moreover, fueling an MAE-based electricity generation system with methanol makes it possible to operate a spark ignition engine at very high efficiency (50% or greater) by using open Rankine cycle waste energy recovery. MAE-based systems can also be operated so as to allow switching between hydrogen, methanol and ammonia.

MAE-based energy systems can also be employed with hydrogen that is stored in hydrides. The relatively high exhaust temperatures produced by MAE-based engines using spark ignited stoichiometric operation can be used to facilitate release of hydrogen that is stored in a hydride.

It should be noted that in terms of volume density, the highest hydrogen storage capacity is in ammonia, followed by methanol and hydrides, liquid hydrogen, with hydrogen gas about ⅓ as high as the ammonia, even when at 700 bar.

Fuel Switching Capability

MAE-based systems can offer the advantages of on-demand switching of the fuel that is used. With appropriate engines and components, the fuel can be switched based on parameters that include fuel availability, fuel cost, and duration of use of the MAE-based system. The switching can also include fuel mixing. For example, the MAE-based system can initially be operated with low carbon fuel, such as hydrogen (or low carbon methanol ethanol or ammonia) and can switch to operation using natural gas or hydrogen and natural gas if the duration for use exceeds or will exceed a level where the available low-carbon fuel would be exhausted. In this way, very long duration use can be assured. Gasoline or propane could also be used as a backup to renewable fuels if needed. Alternatively, multiple fuels could be used simultaneously (fuel blending, with natural gas, propane, liquid fuels, alcohols, hydrogen), in order to improve the performance of the engine or the economics of the process. Fuel switching is simplified because of the limited range of engine map operation of the engines and the engine stable operating conditions. Power adjustment is achieved through changing the number of operating engines, not by changing the load, speed of other parameters of the operating engines.

Because of the on-off operation characteristics provided by a highly multiplexed operation, the engine power level of each engine set does not need to vary to respond to transients in demand. In contrast, this variation is required for on-road engines, or is required for present engine-generator systems, with one or a small number of engines in order to address changing electricity requirements. As a result, the MAE engines can be fueled by mixing upstream of the manifold. The purpose is to provide good mixing and thus all the cylinders have the same air/fuel ratio. Because of the narrow operating points, fuel control is easily achieved, with air flow constant or nearly constant.

Carburation can be used, but is not needed because of the constant nature of the air flow. The fuel can be controlled/metered either by pulse-width modulation or through a variable opening valve. The valve can be controlled through a closed loop (for example, a lambda sensor or an oxygen sensor). Different fuels, and in particular, gaseous fuels can be introduced in this manner. Changing fuels is relatively straight forward, as the engine needs to operate at a narrow range of air flows, and thus, the rate of injection of fuel does not vary much either.

Capability for fuel switching can play an important role in the introduction of very low carbon hydrogen (hydrogen for natural gas+CCS or electrolyzer hydrogen) into systems for providing supplemental power and energy storage capability for the electric grid. The present production levels of electrolyzer hydrogen production and hydrogen storage capability are very low relative to what is needed for all the anticipated needs. At least two decades of development and deployment may be needed to bring production levels up to a substantial fraction of these needs. During this time window, the use of other low pollution fuels, especially an existing low carbon fuels, such as corn or sugar based ethanol, can play an important role. As very low carbon hydrogen becomes more available, it can be readily introduced into MAE-based engines together with other fuels that are in greater supply.

One approach for providing MAE-based engines for extensive on-demand fuel switching capability is to use existing production automobile engines that are built for flex fuel gasoline-ethanol engines (e.g., engines in the US that are E85 capable as well as gasoline). These engines can be easily modified to allow flex fuel operation on methanol by minor modification of the oxygen sensor control of the fuel/air ratio and by use of more resistance elastomers that are appropriate for methanol use. Use of natural gas or hydrogen can be provided in these engines by introduction of these fuels into the manifold. A lambda or an oxygen sensor can be used to provide a stoichiometric fuel/air ratio for use of various fuels or fuel combinations and thereby facilitate use of three-way catalytic exhaust treatment. If desired, propane could also be added as fuel choice. In this way, fuel flexibility can be provided so as to insure the best use of these fuels under conditions of varying availability, regulatory requirements and cost concerns. These engines could control NOx emissions to around 20 ppm. As discussed previously, modifications of these engines can be used to further reduce NOx levels to ultra low levels to around 2 ppm.

A problem with ammonia as a fuel is the slow combustion rate of the fuel, resulting in misfire. Several modifications of the engine or engine operating conditions may be used to enable operation with ammonia. For example, increased intake temperature can help with operation with ammonia. When operating with turbocharging, disconnecting the intercooler would increase the intake temperature and address operation of the engine, especially at light load during startup or at high engine speeds. Reducing the engine speed would also facilitate the use of ammonia (but this would require the use of AC-DC converters, as described elsewhere). Using high power ignition systems, including the use of prechamber, can also enable the use of ammonia. In addition, it would be possible to use mixtures of ammonia with other fuels, such as hydrogen, gasoline, DME. The hydrogen can be obtained from high temperature (450 C-600 C) decomposition of ammonia fuel.

Another option for an alternative fuel to electrolyzer hydrogen is to provide a lower carbon fuel that uses mixtures of natural gas and electrolyzer hydrogen. Although these mixtures may not provide as low a carbon fuel as electrolyzer hydrogen, they can provide an important evolutionary path for electricity production from this fuel. The MAE-based engines can be readily operated at varying natural gas to hydrogen ratios. They have substantially lower cost than fuel cells for operation with these mixtures. MAE-based power generation with natural gas-hydrogen mixtures is also attractive for producing electricity for pipeline mixtures of natural gas and hydrogen. Another use of MAE-based systems can be to provide low cost natural gas powered electricity in parallel with electricity from electrolyzer hydrogen. MAE-based systems are also attractive for producing electricity from hydrogen that does not have sufficiently high purity for fuel cells.

For fuel cell applications, the hydrogen purity has to be high. Some hydrogen contaminants, such as sulfur compounds and CO, need to be controlled to less than 1 part per million to avoid poisoning of the fuel cell, especially for low temperature fuel cells. Hydrogen combustion in internal combustion engines can offer very high efficiencies, due to the high octane of hydrogen fuel and the very high flame speed, which enables high dilution, with either lean operation or heavy EGR, or a combination of the two. However, in the case of MAE-based generation systems, the hydrogen does not have to have high purity.

The approaches for fuel switching and engine multiplexing that have been previously described can also be used with engine generator sets using higher power levels engines (e.g. engine generator sets using spark ignition engines and producing 1 to 10 MW).

Component Sharing Between Engine Generators Sets

It is possible to have common ancillary system required for the engine-generator units to simplify the system, reduce the number of components and/or to decrease the capital and maintenance costs. Examples of these systems are cooling, lubrication, exhaust aftertreatment, air supply, electrical system (engine generator, battery). Although there is the possibility of using mass-produced components that address the need of each component separately, it is also possible to make them common amongst several or all of the units in one power module. Below, there are discussions of some of these systems that can be shared between engine-generator units.

There is a need for substantial cooling of the engines in the power module. It is possible to have a single large engine radiator (cooler), but economies of scale may prefer that smaller engine radiators are used because of the small cost due to mass production of the smaller radiators. On the other hand, having a large engine radiator (e.g. the radiator from a large truck), could simplify the coolant changing operation, since the engine coolant would be shared. It is possible to use relatively sophisticated engine coolant monitors to determine the conditions of the coolant, and to monitor when something is wrong in one or more of the engines. If multiple radiators are used, the radiators could be placed on the top for the trailer, for improved air circulation. However, it is also possible to place them closer to the engines for more compact settings.

Another system that could be shared is the air supply. It is possible to have one or a small number of air filters for the entire module, to minimize the requirement when doing maintenance, such as air filter changes, or a compressor.

As with the coolant, it may be possible to share the oil between engines, simplifying the maintenance. A single large oil filter could be used, or a few oil filters, with monitoring to determine when the engine oil needs replacement, instead of using a replace-by-schedule, minimizing unnecessary maintenance and down time. As with the coolant, because the oil is shared between the engine, relatively expensive oil condition monitors can be minimized.

In addition to sharing the air supply, it would be possible to have a single fueling system for all the engines in a module. Fuel and air can be premixed in one unit and fed to all the engines in a module, simplifying the air/fuel control. Also, care can be taken to assure that air/fuel mixture is properly mixed, which can be challenging when using gaseous mixtures.

Substantial air flow is required for both the engine operation, as well as for radiator cooling. In the case of the air for the engines, operating at 100 kW with 10 engines requires an air flow rate of about 1 m^3/s (about 1500 cfm). The engine can each have their own air flow system, or they may run from a single or a small number of shared air flow systems, manifolded.

The exhaust needs to be evacuated from the container. Again, each engine could have its own exhaust system, with mufflers and exhaust aftertreatment system (in the case of stoichiometric operated engines, a three-way catalyst). The outlet of the aftertreatment system could be manifolded into one or a small number of vents, or each could have its own vent.

MAE-Based Electricity Generation Systems for Non-Grid Back Up Power and Emergency Power The MAE-based modular generation systems that were described previously can be used in a variety of non-grid back-up power applications. These applications include but are not limited to hospitals, data centers, financial institutions and government facilities. To ensure resiliency, these systems would be designed for fueling with an onsite stored liquid fuel. The liquid fuel should have a sufficiently low flash temperature to enable its storage inside a building. Diesel fuel is presently used for most of these applications but has the disadvantage of producing large NOx and particulate air emissions. The use of compression ignition engines that are diesel car and light truck engines along with their NOx and particulate reduction systems could substantially reduce air pollution relative to many present diesel engine generators.

Alternatively, SI engines using ethanol as a fuel could be used. Presently available corn-based ethanol has the advantage of having a much higher flash temperature than gasoline as well as having a lower carbon intensity than gasoline or diesel. The use of SI engines operated on ethanol could provide a factor ten times lower NOx than diesel engines with SCR exhaust treatment and one hundred times lower than diesel generators without exhaust treatment.

Relative to present back-up power systems, modular MAE-based generation backup generation systems with maximum power outputs in the 1 to 100 MW range could provide the advantages of lower capital cost, lower air pollution; flexibility in maximum power level; and being easy transported to the electricity generation location. The MAE-based systems could provide much faster startup times (e.g. less than 10 seconds) than large single engines and gas turbines. Generation system startup time could be further shortened by combination with a high power battery system (e.g. to less than 1 second). The battery system cost could be relatively low because of a short time duration requirement.

Typical numbers of engine-generator units for these back up power systems would be more than 30 units and, in some cases, greater than 50 units.

The MAE-based generation systems could also be operable on natural gas, if desired.

MAE-based generation systems could also provide the above advantages for easily transportable emergency power.

The engines could be designed to operate on diesel fuel or with gasoline with diesel compression ignition.

Location of MAE Electricity Generation Systems at Fueling Stations that Provide Both Gasoline, Other Liquid Fuels and Electric Vehicle Charging.

The MAE-based power systems can also be used at service stations to provide electric vehicle recharging when grid power is not available; MAE-based units can serve the dual purpose of also providing power for the liquid fuel pumps. The stations can provide gasoline, ethanol derived from corn or other sources, and other liquid fuels or mixtures of these fuels with gasoline. The MAE-based system could be fueled with one of the liquid fuels that the fuel station is selling, or if available, natural gas. When using low carbon liquid fuels, obtaining electricity from an MAE-based generation system to power electric vehicle recharging may in some cases be less costly than using grid electricity (due to savings from distribution, among other factors) and/or could provide less total greenhouse gas emissions than grid electricity (e.g., if the grid has a substantial fraction of coal generated electricity).

The refueling station could also have battery storage. The batteries are charged with inexpensive electricity, when available. When grid electricity not available or undesirable, the batteries are recharged by the MAE-based system. The batteries can be discharged at a higher rate than charging, as the charging station are idle a substantial fraction of the time, enabling a reduced size MAE-based system to provide the charge when grid electricity is expensive or not available. Thus, very high power vehicle charging can be achieved with relatively low power generation, enabled by the different capacity factors of the MAE-based system and the battery discharge for vehicle charging.

In addition, for fueling vehicles with hydrogen, high power may be required for driving the compressors used to bring the hydrogen pressure from the stored pressure at the station to the pressure required for storing hydrogen in the vehicle. The power can be provided either directly by the MAE-based system or from batteries that are rapidly discharged. An option is for the compressors to be directly driven by modified automotive engines, avoiding the need for an electrical generator and an electrical motor. In this case, the engines are serving the compressors exclusively.

The electricity generation systems could utilize the same features as described above, including the use of modular power modules that are in containers.

The fueling stations could be public fueling stations or fueling stations for companies or government vehicles. They could provide fuel for light, medium and heavy duty vehicles.

In addition to the fuels discussed above, the fueling stations could alternatively or additionally provide diesel fuel pumps for vehicles and use diesel fuel to provide fuel for the electricity generation system.

Over the longer term, lower carbon liquid fuels produced from solid feedstocks could be sold at these fueling stations. The same fuel could be used in the MAE-based generation systems.

Figure 14:
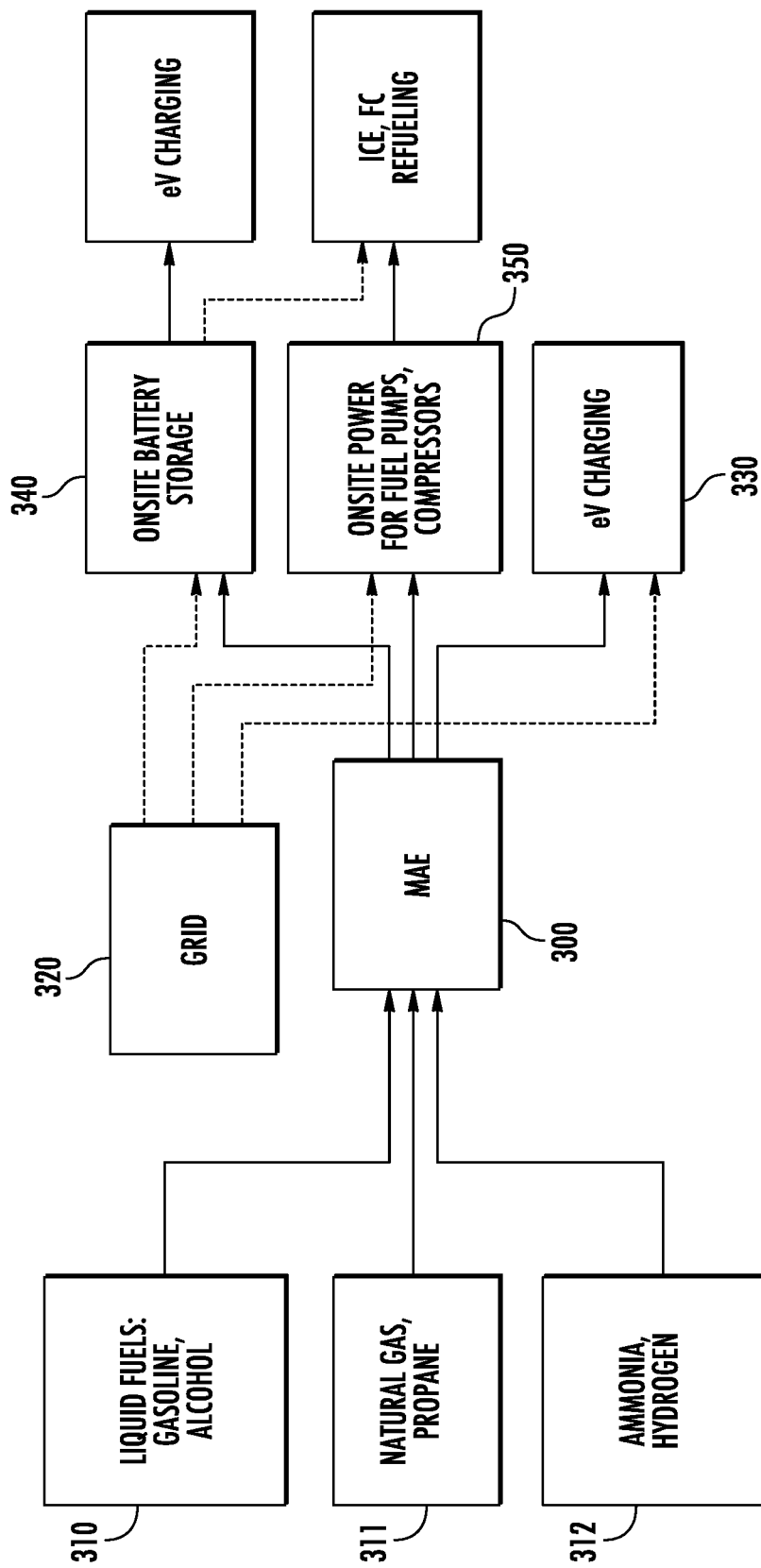
FIG. 14 is a fueling station according to one embodiment.

A schematic diagram showing the features of this type of fueling system is in FIG. 14.

The fueling station generation systems described above could also be used as means to provide dispatchable supplemental power to the grid.

A flexible system for a fueling station is schematically shown in FIG. 14. Multiple fuels 310, 311, 312, such as ammonia, hydrogen, natural gas, or liquids, such as gasoline and alcohols, are provided for use in the MAE-based power system 300. Some of the fuels, such as gasoline, propane, ammonia, hydrogen, and alcohols, can be stored on-site, while other fuels can be provided by a pipeline, such as natural gas. When the grid 320 is up and electricity prices are low, electricity is used for electric vehicle changing 330 and for charging onsite battery storage 340 or other onsite power demands. When the grid 320 is not available or the prices are high, the MAE-based system 300 is engaged and generates the electricity, both to run the fuel pumps and compressors 350 required for refueling the vehicles, as well as for charging electric vehicles 330.

CONCLUSIONS

Modular MAE-based generation systems can play an important role in insuring present and future grid reliability by providing flexible low cost, clean supplemental power that is used to compensate for unusual supply shortfalls of relatively long durations (e.g. greater than 12 hrs) due to increased demand or reduced generation. The occurrence of these supply shortfalls will very likely increase with increasing use of variable renewable electricity as grids become decarbonized. MAE-based systems can be especially attractive for addressing long duration supply shortfalls at low capacity factor (e.g., less than 10%). MAE-based generation systems can also provide important advantages for non-grid electricity applications including microgrids, backup power for various non-residential uses (e.g. hospitals, data centers, distribution centers). Furthermore, they can provide advantages for emergency power.

A preliminary cost analysis indicates that the installed cost/kW for MAE-based systems would be around $100/kW in comparison to around $700/kW for an OCGT. For an illustrative example of a battery with a present cost of $180/kWhr which is used to provide a 48 hr duration supply of electricity the installed cost would be around $8600/kW. This cost increases linearly with increasing required duration. Even with reductions in battery cost, there will be a duration requirement at which batteries are prohibitively expensive.

In addition to low cost, MAE-based generation systems can also provide fuel flexibility advantages that include capability to switch between a wide range of fuels. These fuels include presently available fuels (natural gas, hydrogen, hydrogen-hydrocarbon gas mixtures and low carbon ethanol) and future very low carbon liquid fuels (ethanol, methanol, ammonia). The greater fuel flexibility of MAE-based systems relative to OCGTs can result in lower fuel cost for low carbon fuels and thus provide considerably lower delivered electricity costs than OCGTs under conditions where the lower CAPEX of MAE-based systems is a less important factor in total delivered electricity cost (e.g. when fuel cost is the dominant cost or when the capacity factor is not low).

The MAE-based systems also provide greater flexibility in power output and siting along with a rapid response, such as <10 seconds and preferably <5 seconds in comparison to >600 seconds for an OCGT. MAE-based systems can also provide advantages of flexibility in power capability; location flexibility; and use in a microgrid or local grid with switching of its power between these grids and a larger grid. Moreover, MAE-based electricity generation systems can be used in advantageous combinations with batteries and can provide advantages in hydrogen energy storage systems. The multiplexing, modular and power output control approaches and also other aspects of the electricity generating systems described herein could also be used with reciprocating engines that are not modified automotive engines. These other aspects include but are not limited to use with batteries for various grid applications; use in various hydrogen energy storage systems; and the use of DC generation to facilitate higher rpm, higher power engine operation.

What is claimed is:

1. An electricity generation system that uses multiple engine powered generators to provide electricity to a grid; wherein the engines are modified automotive engines; wherein the electricity generation system provides electricity to the grid when there are shortfalls in electricity supply from variable renewable electricity created from wind and/or solar energy; wherein the engine powered generators are disposed in truck transportable container power modules that each includes multiple engine powered generators; wherein the maximum power produced per power module is at least 1 MW; wherein each of the container power modules weighs less than 20 tons; wherein the electricity generation system comprises more than one power module; wherein the power generated by the electricity generation system can be varied by turning engines in the power modules on and off and/or by turning power modules on and off; wherein at least one engine is powered by a gaseous or liquid fuel; and wherein at least one of the automotive engines is a spark ignition engine operated with a stoichiometric fuel/air ratio and uses a three-way catalyst for reduction of NOx emissions.

2. The electricity generation system of claim 1, wherein AC power from the engine powered generators is converted into DC power and the DC power from the engine powered generators is combined and sent out as a DC power output from the power module.

3. The electricity generation system of claim 2, where an AC frequency from at least one engine powered generator varies.

4. The electricity generation system of claim 2, wherein cold start time of the DC power produced by the electricity generation system is less than 10 seconds.

5. The electricity generation system of claim 1, wherein at least one of the engines is a natural aspirated engine that is operated in a sweet spot range of 1000-3500 rpm and a brake mean effective pressure of 10 to 14 bar.

6. The electricity generation system of claim 1, where at least one of the engine powered generators is produced from motors that are produced for electric vehicles.

7. The electricity generation system of claim 1, wherein at least one of the engines is operated so as absorb electrical power from the grid by using valve control that causes the electrical power to be used in pulling a vacuum in one or more engine cylinders.

8. The electricity generation system of claim 1, wherein air is added downstream of the three-way catalyst that is used with the at least one spark ignition engine that is operated with a stoichiometric fuel/air ratio and selective catalytic reduction (SCR) treatment is used for reduction of NOx in exhaust gas from the three way-catalyst.

9. The electricity generation system of claim 1, wherein the variable renewable electricity is used to produce a fuel that is later used by the electricity generation system to supply electricity to the grid when there is a shortfall in the supply of the variable renewable electricity and wherein the fuel that is produced is at least one of hydrogen, methanol or ammonia.

10. The electricity generation system of claim 1, wherein at least one of engines is operated with natural gas and/or at least one of ethanol, methanol or gasoline.

11. The electricity generation system of claim 1, wherein the gaseous or liquid fuel is E85.

12. An engine powered generator wherein the engine is a spark ignition engine that is operated with a stoichiometric fuel/air ratio and a three-way catalyst is used for reduction of NOx emissions from the engine; wherein air is introduced to exhaust gas from the three-way catalyst and wherein the air and the exhaust gas from the three-way catalyst pass through an SCR; and wherein the air provides a lean mixture for the SCR and the SCR reduces the NOx level in the gas that emerges from the three-way catalyst.

13. The engine powered generator of claim 12, wherein the three-way catalyst is located close to the engine and the SCR is located further away for the engine.

14. The engine powered generator of claim 12, wherein the engine is operated at a sweet spot which provides a temperature desired for SCR operation.

15. The engine powered generator of claim 12, wherein dosing of the SCR with ammonia is controlled by use of measurements of NOx and ammonia.

16. The engine powered generator of claim 12, wherein the air and ammonia are introduced to the SCR such that a NOx concentration in exhaust from the SCR is less than 2 ppm.

17. An electricity generation system that uses multiple engine powered generators to provide electricity to a grid; wherein the engines are modified automotive engines; wherein the electricity generation system provides electricity to the grid when there are shortfalls in electricity supply from variable renewable electricity created from wind and/or solar energy; wherein the engine powered generators are disposed in truck transportable container power modules that each includes multiple engine powered generators; wherein the maximum power produced per power module is at least 1 MW; wherein each of the container power modules weigh less than 20 tons; wherein the electricity generation system comprises more than one power module; wherein the power generated by the electricity generation system can be varied by turning engines in the power modules on and off and/or by turning power modules on and off; wherein at least some of the automotive engines are spark ignition engines operated with a stoichiometric fuel/air ratio and use a three-way catalyst for emissions reduction; and wherein the variable renewable electricity is used in production of at least one of hydrogen or methanol that is stored and later used by the electricity generation system to supply electricity to the grid when there is a shortfall in the supply of variable renewable electricity.

18. The electricity generation system of claim 17, wherein AC power from the engine powered generators is converted into DC power and the DC power from the engine powered generators is combined and sent out as a DC power output from the power module.

19. The electricity generation system of claim 17, wherein the hydrogen is produced from pyrolyic conversion of methane in natural gas.

20. The electricity generation system of claim 17, wherein air is added to exhaust gas from the three-way catalyst and SCR is used for additional NOx reduction.

21. The electricity generation system of claim 17, wherein hydrogen can be blended on-demand with natural gas to fuel the automotive engines; and wherein zero to 100% hydrogen can be used.

22. The electricity generation system of claim 17, wherein the hydrogen is produced more slowly than it is used in at least one engine to provide power to the grid.

23. An electricity generation system that uses multiple engine powered generators to provide electricity to a grid;
   wherein the engines are modified automotive engines;
   wherein the electricity generation system provides electricity to the grid when there are shortfalls in electricity supply from variable renewable electricity created from wind and/or solar energy;
   wherein the engine powered generators are disposed in truck transportable container power modules that each includes multiple engine powered generators;
   wherein the maximum power produced per power module is at least 1 MW;
   wherein each of the container power modules weigh less than 20 tons;
   wherein the electricity generating system comprises more than one power module;
   wherein the power generated by the electricity generation system can be varied by turning engines in the power modules on and off and/or by turning power modules on and off;
   wherein at least some of the automotive engines are spark ignition engines operated with a stoichiometric fuel/air ratio and use a three-way catalyst for emissions reduction; and
   wherein the variable renewable electricity is used in production of ammonia that is later used by the electricity generation system to supply electricity to the grid when there is a shortfall in the electricity supply of the variable renewable electricity.

24. The electricity generation system of claim 23, wherein waste heat from at least one spark ignition engine is used to decompose ammonia.

25. The electricity generation system of claim 23, wherein the ammonia that is produced using the variable renewable electricity is sent to an SCR that reduces the NOx in exhaust from the three-way catalyst.

26. The electricity generation system of claim 23, where both ammonia and hydrogen are used to fuel at least one spark ignition engine.

27. The electricity generation system of claim 23, where increased fuel temperature in at least one spark ignition engine is employed to increase ammonia combustion rate.

28. The electricity generation system of claim 23, wherein use of AC generator power to DC power conversion is employed to enable variation of engine speed.

29. The electricity generation system of claim 28, wherein the engine is operated so that it meets a combustion stability requirement.

30. The electricity generation system of claim 23, wherein conversion of AC power from the engine powered generators to DC power is employed.

31. The electricity generation system of claim 23, where AC to DC power conversion enables adjustment of the rpm of the engines so as to enable stable combustion.

* * * * *